United States Patent
Miyauchi et al.

(10) Patent No.: US 8,350,948 B2
(45) Date of Patent: Jan. 8, 2013

(54) IMAGE DEVICE WHICH BYPASSES BLURRING RESTORATION DURING A THROUGH IMAGE

(75) Inventors: Yoichi Miyauchi, Tokyo (JP); Shigeyasu Murase, Tokyo (JP); Yusuke Hayashi, Tokyo (JP)

(73) Assignee: Kyocera Corporation, Kyoto (JP)

( * ) Notice: Subject to any disclaimer, the term of this patent is extended or adjusted under 35 U.S.C. 154(b) by 762 days.

(21) Appl. No.: 12/095,490

(22) PCT Filed: Nov. 29, 2006

(86) PCT No.: PCT/JP2006/323851
§ 371 (c)(1),
(2), (4) Date: Jul. 6, 2009

(87) PCT Pub. No.: WO2007/063918
PCT Pub. Date: Jun. 7, 2007

(65) Prior Publication Data
US 2010/0053350 A1 Mar. 4, 2010

(30) Foreign Application Priority Data

Nov. 29, 2005 (JP) ................. 2005-344305
Dec. 27, 2005 (JP) ................. 2005-376665
May 30, 2006 (JP) ................. 2006-150749

(51) Int. Cl.
*H04N 5/222* (2006.01)
(52) U.S. Cl. ............... 348/333.11; 348/222.1; 382/279; 359/238; 359/707
(58) Field of Classification Search ............. 348/333.11, 348/222.1; 382/279; 359/238, 707
See application file for complete search history.

(56) References Cited

U.S. PATENT DOCUMENTS

| | | | |
|---|---|---|---|
| 4,860,104 A | 8/1989 | Katsuyama | |
| 6,021,005 A | 2/2000 | Cathey, Jr. et al. | 359/737 |
| 6,069,738 A | 5/2000 | Cathey, Jr. et al. | 359/558 |
| 6,525,302 B2 | 2/2003 | Dowski, Jr. et al. | 250/201.2 |
| 6,642,504 B2 | 11/2003 | Cathey | 250/216 |
| 7,885,489 B2 * | 2/2011 | Hayashi et al. | 382/312 |
| 7,916,194 B2 * | 3/2011 | Hayashi et al. | 348/294 |
| 7,944,490 B2 * | 5/2011 | Hayashi | 348/294 |

(Continued)

FOREIGN PATENT DOCUMENTS
EP 0314269 A2 5/1989
(Continued)

OTHER PUBLICATIONS

Edward R. Dowski, Jr., "Wavefront Coding: A modern method of achieving high performance and/or low cost imaging system".

(Continued)

*Primary Examiner* — Sinh Tran
*Assistant Examiner* — Paula Berardesca
(74) *Attorney, Agent, or Firm* — DLA Piper LLP (US)

(57) ABSTRACT

An imaging device able to simplify an optical system while maintaining a high frame rate, but without needing expensive blurring restoration processing hardware, able to reduce costs, and in addition capable of obtaining a restored image little influenced by noise, and a method of same, which bypasses blurring restoration processing of an image processing device 150 by a switching unit 140 to perform camera signal processing of a camera signal processing unit 160 at the time of a through image and performs blurring restoration processing at the image processing device 150, then performs camera signal processing at the camera signal processing unit 160 to display the image only at the time of capturing an image.

6 Claims, 30 Drawing Sheets

U.S. PATENT DOCUMENTS

| | | | |
|---|---|---|---|
| 8,059,955 B2* | 11/2011 | Ohara et al. | 396/125 |
| 2002/0003581 A1* | 1/2002 | Sato et al. | 348/333.11 |
| 2002/0195538 A1* | 12/2002 | Dowsk et al. | 250/201.2 |
| 2003/0057353 A1 | 3/2003 | Dowski, Jr. et al. | |
| 2005/0259114 A1* | 11/2005 | Belmon et al. | 345/613 |
| 2009/0321618 A1* | 12/2009 | Ohara et al. | 250/227.2 |

FOREIGN PATENT DOCUMENTS

| | | |
|---|---|---|
| JP | 2000-005127 | 1/2000 |
| JP | 2002-369071 | 12/2002 |
| JP | 2003-235794 | 8/2003 |
| JP | 2004-153497 | 5/2004 |
| JP | 2004-328506 | 11/2004 |

OTHER PUBLICATIONS

Edward R. Dowski, Jr.,"Wavefront Coding: Jointly optimized and digital imaging system".

Chinese language office action and its English language translation for corresponding Chinese application 20068005201.2.

ER Dowski and GE Johnson, "Wavefront Coding: A modern method of achieving high performance and/or low cost imaging systems" SPIE Proceedings, vol. 3779, pp. 137-145, Oct. 1999.

ER Dowski et al., "Wavefront Coding: jointly optimized optical and digital imaging systems" SPIE Proceedings, vol. 4041, pp. 114-120, Apr. 25, 2000.

Chinese language office action dated Feb. 12, 2010 and its English language translation issued in corresponding Chinese application 200680052012.2.

* cited by examiner

FIG. 8C BLURRING RESTORED IMAGE

| B(i-2,j-2) | B(i-2,j-1) | B(i-2,j) | B(i-2,j+1) | B(i-2,j+2) |
|---|---|---|---|---|
| B(i-1,j-2) | B(i-1,j-1) | B(i-1,j) | B(i-1,j+1) | B(i-1,j+2) |
| B(i,j-2) | B(i,j-1) | B(i,j) | B(i,j+1) | B(i,j+2) |
| B(i+1,j-2) | B(i+1,j-1) | B(i+1,j) | B(i+1,j+1) | B(i+1,j+2) |
| B(i+2,j-2) | B(i+2,j-1) | B(i+2,j) | B(i+2,j+1) | B(i+2,j+2) |

FIG. 8B BLURRED IMAGE

| A(i-2,j-2) | A(i-2,j-1) | A(i-2,j) | A(i-2,j+1) | A(i-2,j+2) |
|---|---|---|---|---|
| A(i-1,j-2) | A(i-1,j-1) | A(i-1,j) | A(i-1,j+1) | A(i-1,j+2) |
| A(i,j-2) | A(i,j-1) | A(i,j) | A(i,j+1) | A(i,j+2) |
| A(i+1,j-2) | A(i+1,j-1) | A(i+1,j) | A(i+1,j+1) | A(i+1,j+2) |
| A(i+2,j-2) | A(i+2,j-1) | A(i+2,j) | A(i+2,j+1) | A(i+2,j+2) |

FIG. 8A RESTORATION FILTER

| f(-1,-1) | f(-1,0) | f(-1,+1) |
|---|---|---|
| f(0,-1) | f(0,0) | f(0,+1) |
| f(+1,-1) | f(+1,0) | f(+1,+1) |

FIG. 9A

| R | G | B | R | G | B |
|---|---|---|---|---|---|
| R | G | B | R | G | B |

STRIPE ARRAY

FIG. 9B

| R | G | B | R |
|---|---|---|---|
| B | R | G | B |
| G | B | R | G |
| R | G | B | R |

DIAGONAL ARRAY

FIG. 9C

| R | G | B | R |   |
|---|---|---|---|---|
|   | B | R | G | B |
| R | G | B | R |   |
|   | B | R | G | B |

DELTA ARRAY

FIG. 9D

| G | B | G | B |
|---|---|---|---|
| R | G | R | G |
| G | B | G | B |
| R | G | R | G |

RECTANGLE ARRAY

FIG. 15

| EXAMPLE OF KERNEL DATA STORAGE ROM | | | |
|---|---|---|---|
| OPTICAL MAGNIFICATION | ×1.5 | ×5 | ×10 |
| KERNEL DATA | A | B | C |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

$$C = \begin{pmatrix} a' & b' & c' & d' \\ e' & f' & g' & h' \\ i' & j' & k' & l' \\ m' & n' & o' & p' \end{pmatrix}$$

FIG. 16

| EXAMPLE OF KERNEL TABLE | | | |
|---|---|---|---|
| STOP | F2.8 | F4 | F5.6 |
| KERNEL | A | B | C |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

$$C = \begin{pmatrix} a' & b' & c' & d' \\ e' & f' & g' & h' \\ i' & j' & k' & l' \\ m' & n' & o' & p' \end{pmatrix}$$

DEFOCUS = 0.2mm

BEST FOCUS

DEFOCUS = −0.2mm

FIELD(0.000, 0.000)

IMAGE DEVICE WHICH BYPASSES BLURRING RESTORATION DURING A THROUGH IMAGE

CROSS-REFERENCE TO RELATED APPLICATIONS

This application is a national stage of International Application No. PCT/JP2006/323851 filed on Nov. 29, 2006, and claims the benefit of priority under 35 USC 119 of Japanese Patent Application No. 2005-344305 filed on Nov. 29, 2005; Japanese Patent Application No. 2005-376665 filed Dec. 27, 2005 and Japanese Patent Application No. 2006-150749 filed May 30, 2006 which are incorporated herein by reference.

TECHNICAL FIELD

The present invention relates to a digital still camera, a camera mounted in a mobile phone, a camera mounted in a personal digital assistant, an image checking device, an automatic control use industrial camera, or other imaging device using an imaging element and having an optical system and a method of same.

BACKGROUND ART

In recent years, rapid advances have been made in digitalization of information. This has led to remarkable efforts to meet with this in the imaging field.

In particular, as symbolized by the digital camera, in the imaging surfaces, film is being taken over by use of solid-state imaging elements such as CCDs (charge coupled devices) or CMOS (complementary metal oxide semiconductor) sensors in most cases.

An imaging lens device using a CCD or CMOS sensor for the imaging element in this way optically captures the image of an object by the optical system and extracts the content as an electric signal by the imaging element. Other than a digital still camera, this is used in a video camera, a digital video unit, a personal computer, a mobile phone, a personal digital assistant (PDA), an image checking device, an automatic control use industrial camera, and so on.

FIG. 1 is a diagram schematically showing the configuration of a general imaging lens device and a state of light rays.

This imaging lens device 1 has an optical system 2 and a CCD or CMOS sensor or other imaging element 3.

The optical system includes object side lenses 21 and 22, a stop 23, and an imaging lens 24 sequentially arranged from the object side (OBJS) toward the imaging element 3 side.

In the imaging lens device 1, as shown in FIG. 1, the best focus plane is made to match with the imaging element surface.

FIG. 2A to FIG. 2C show spot images on a light receiving surface of the imaging element 3 of the imaging lens device 1.

Further, imaging devices using phase plates (wavefront coding optical elements) to regularly disperse the light rays, using digital processing to restore the image, and thereby enabling capture of an image having a deep depth of field and so on have been proposed (see for example Non-patent Documents 1 and 2 and Patent Documents 1 to 5).

Further, an automatic exposure control system of a digital camera performing filtering using a transfer function has been proposed (see for example Patent Document 6).

Non-patent Document 1: "Wavefront Coding; jointly optimized optical and digital imaging systems", Edward R. Dowski, Jr., Robert H. Cormack, Scott D. Sarama.

Non-patent Document 2: "Wavefront Coding; A modern method of achieving high performance and/or low cost imaging systems", Edward R. Dowski, Jr., Gregory E. Johnson.

Patent Document 1: U.S. Pat. No. 6,021,005
Patent Document 2: U.S. Pat. No. 6,642,504
Patent Document 3: U.S. Pat. No. 6,525,302
Patent Document 4: U.S. Pat. No. 6,069,738
Patent Document 5: Japanese Patent Publication (A) No. 2003-235794
Patent Document 6: Japanese Patent Publication (A) No. 2004-153497

DISCLOSURE OF THE INVENTION

Problem to be Solved by the Invention

All of the imaging devices proposed in the documents explained above are predicated on a PSF (Point-Spread-Function) being constant when inserting the above phase plate in the usual optical system. If the PSF changes, it is extremely difficult to realize an image having a deep depth of field by convolution using the subsequent kernels.

Accordingly, leaving aside the case of lenses with a single focal point, in lenses of a zoom system, AF system, etc., the high level of precision of the optical design thereof and the accompanying increase in costs cause major problems in adoption of this.

In other words, in the imaging device explained above, suitable convolution processing is not possible. An optical design eliminating the astigmatism, coma aberration, zoom chromatic aberration, and other aberration causing deviation of the spot image at the time of the "wide" mode and at the time of the "tele" mode is required.

However, optical design eliminating these aberrations increases the difficulty of the optical design and induces problems such as an increase of the number of design processes, an increase of the costs, and an increase in size of the lenses.

Further, in the device disclosed in each document explained above, when for example capturing an image in a dark place and restoring the image by signal processing, noise is simultaneously amplified as well.

Accordingly, in an optical system including an optical system and signal processing that uses for example the above-mentioned phase plate or other optical wavefront modulation element and signal processing after that, there is the disadvantage that when a capturing an image in a dark place, noise is amplified and has an effect on the restored image.

Further, the method of reducing the F value (aperture) in order to achieve a deep depth of field involves disadvantages that a stop mechanism is necessary, the lens becomes dark and the dynamic range cannot be taken with respect to luminance by closing down the stop, and a shutter speed is lowered, so hand shake and object shake are easily caused.

Further, in the method of using image processing to perform defocusing (blurring) restoration processing, the processing is very heavy. Therefore, in order to continually correct blurring even during a display of a through image, the required resources become large in scale and expensive hardware becomes necessary. Alternatively, the restriction arises that a frame rate cannot be raised in accordance with the processing capability. When the frame rate is considerably lowered, the shutter timing is also liable to be missed.

Further, in for example the existing art, the size of a filter used for the image restoration processing is a fixed size irrespective of the image capturing mode. Accordingly, there is the disadvantage that when carrying out the image restoration processing at the time of capturing of a moving picture by a filter size of the image restoration processing at the time of capturing a still image, the processing time per frame becomes long, so it becomes impossible to perform the processing in real time.

Conversely, there is the disadvantage that when a filter size capable of performing the processing in real time is set at the time of the display of the through image (time of preview), this time the restored image at the time of capturing a still image deteriorates.

An object of the present invention is to provide an imaging device able to simplify the optical system while maintaining a high frame rate, but not needing expensive blurring restoration processing hardware, able to reduce costs, able to realize processing in real time in accordance with the image capturing mode without deterioration of the restored image, and in addition capable of obtaining a restored image with small influence of noise, and a method of the same.

Means for Solving the Problem

An imaging device of a first aspect of the present invention has an optical system formed so that an amount of blurring of a focal point becomes substantially constant at a focus position and at distances before and after it, an imaging element capturing an object image passing through the optical system, a converting means for correcting the blurring of the focal point of the image from the imaging element and generating a restored image signal, a signal processing means for performing predetermined image processing on the image signal, a switching means for selectively inputting the image signal from the imaging element or the image signal from the converting means to the signal processing means, a storage means for storing the processed image of the signal processing means, a trigger signal generating means for generating a trigger signal instructing the image storage, an image monitoring means for displaying the processed image of the signal processing means, and a controlling means for inputting the image signal from the imaging element to the signal processing means through the switching means during the display of a through image and, when receiving the trigger signal from the trigger signal generating means, inputting the image signal from the converting means to the signal processing means.

An imaging device of a second aspect of the present invention has an optical system formed so that an amount of blurring of a focal point becomes substantially constant at a focus position and at distances before and after it, an imaging element capturing an object image passing through the optical system, a converting means for correcting the blurring of the focal point of the image from the imaging element and generating a restored image signal, a first filter used for the image restoration processing of the converting means at the time of a still image capturing mode, and a second filter used for the image restoration processing of the converting means at the time of at least a moving picture capturing mode, wherein the converting means selects at least the first filter or second filter and performs the image restoration processing in accordance with the capturing mode.

Preferably, the device has a signal processing means for performing predetermined image processing on the image signal and an image monitoring means for displaying the processed image of the signal processing means, the second filter is used for the image restoration processing of the converting means at the time of the moving picture capturing mode or the time of the through image display, and the converting means selects the first filter or second filter and performs the image restoration processing in accordance with the image capturing mode or presence/absence of the display of the through image.

Preferably, the converting means performs simple restoration processing using the second filter in accordance with a resolution of the image monitoring means.

Preferably, the second filter includes an image restoration filter using a sampled PSF (Point Spread Function).

Preferably, the second filter has a bandwidth enhancement function.

Preferably, the size of the second filter is smaller than the size of the first filter.

Preferably, the device has a setting means able to set presence/absence of execution of the image restoration processing using the second filter at the time of capturing a moving picture and the time of the display of a through image.

Preferably, the device further has a trigger signal generating means for generating the trigger signal and a controlling means for inputting the image signal subjected to the image restoration processing by the second filter in the converting means to the signal processing means during the display of the through image and, when receiving the trigger signal from the trigger signal generating means, inputting the image signal subjected to the image restoration processing from the first filter in the converting means to the signal processing means.

Preferably, the device has a storage means for storing an image, and the controlling means, at the time of capturing a moving picture, inputs the image signal subjected to the image restoration processing by the second filter to the signal processing means for the display of the through image and, when storing the image in the storage means, executes the image restoration processing by the first filter in the converting means.

Preferably, the device has a storage means for storing an image, and the controlling means, at the time of capturing a moving picture, inputs the image signal subjected to the image restoration processing by the second filter to the signal processing means and stores the same in the storage means.

Preferably, the device further has a switching means for selectively inputting the image signal from the imaging element or the image signal from the converting means to the signal processing means, a trigger signal generating means for generating a trigger signal, and a controlling means for inputting the image signal from the imaging element to the signal processing means through the switching means during the display of a through image and, when receiving the trigger signal from the trigger signal generating means, inputting the image signal from the converting means to the signal processing means.

Preferably, the device has a storage means for storing an image, and the controlling means, at the time of capturing a moving picture, inputs the image signal from the imaging element for which the image restoration processing is not executed to the signal processing means for the display of the through image and, when storing the image in the storage means, executes the image restoration processing by the converting means.

Preferably, the device has a storage means for storing an image, and the controlling means, at the time of capturing a moving picture, inputs the image signal from the imaging element for which the image restoration processing is not executed to the signal processing means, stores the image for which the image restoration processing is not executed in the storage means, and, when reproducing the image from the storage means, executes the image restoration processing by the converting means.

Further, preferably, the amount of blurring of the focal point is set using a resolution of the image monitoring means as the upper limit.

Preferably, the resolution of the image monitoring means is not more than 2 times the pixel pitch of the image monitoring means.

Preferably, the controlling means restores a still image captured by receiving the trigger signal by the converting means, then makes the image monitoring means display the image after processing at the signal processing means.

Preferably, the controlling means makes the imaging element output an image having a required sufficient resolution by the resolution of the image monitoring means during the display of a through image.

Preferably, the optical system has a zoom information generating means including an optical wavefront modulation element and a zoom optical system and generating information corresponding to a zoom position or a zoom amount of the zoom optical system, and the converting means generates a dispersion-free image signal from a dispersed image signal based on information generated by the zoom information generating means.

Preferably, the device has an object distance information generating means for generating information corresponding to a distance up to the object, and the converting means generates a dispersion-free image signal from a dispersed image signal based on the information generated by the object distance information generating means.

Preferably, the device has an object distance information generating means for generating information corresponding to the distance up to the object and a conversion coefficient processing means for processing a conversion coefficient based on the information generated by the object distance information generating means, and the converting means converts the image signal and generates the dispersion-free image signal according to a conversion coefficient obtained from the conversion coefficient processing means.

Preferably, the device has an image capturing mode setting means for setting the image capturing mode of the object to be captured, and the converting means performs different conversion processing in accordance with the image capturing mode set by the image capturing mode setting means.

Preferably, the imaging device can exchange a plurality of lenses, the imaging element has a conversion coefficient acquiring means able to capture an object aberration image passed through at least one lens among the plurality of lenses and the optical wavefront modulation element and further acquiring a conversion coefficient in accordance with the one lens, and the converting means converts the image signal according to the conversion coefficient obtained from the conversion coefficient acquiring means.

Preferably, the device has an exposure controlling means for controlling the exposure, and the signal processing means performs filtering with respect to an optical transfer function (OTF) in accordance with the exposure information from the exposure controlling means.

An imaging method of a third aspect of the present invention comprises the steps of capturing, by an imaging element, an object image passing through an optical system formed so that an amount of blurring of a focal point becomes substantially constant at a focus position and distances before and after it, performing predetermined image processing on an image signal from the imaging element during the display of a through image, and, when receiving a trigger signal instructing image storage, correcting blurring of the focal point of the image from the imaging element to restore the image signal and performing predetermined image processing with respect to the restored image signal.

An imaging method of a fourth aspect of the present invention comprises the steps of capturing, by an imaging element, an object image passing through an optical system formed so that an amount of blurring of a focal point becomes substantially constant at a focus position and distances before and after it, performing predetermined image processing on an image signal from the imaging element during the display of a through image, and correcting blurring of the focal point of the image from the imaging element to restore the image signal and performing predetermined image processing with respect to the restored image signal during which performing image restoration processing by using a first filter at the time of a still image capturing mode and performing image restoration processing by using a second filter having a different size from the first filter at the time of a moving image capturing mode or the time of the display of a through image.

EFFECTS OF THE INVENTION

According to the present invention, the optical system can be simplified while maintaining a high frame rate without needing expensive blurring restoration processing hardware and the costs can be reduced. Further, there are the advantages that processing in real time in accordance with the image capturing mode can be realized without deterioration of the restored image, and, in addition, a restored image with little influence of noise can be obtained.

BRIEF DESCRIPTION OF THE DRAWINGS

FIG. 2A to FIG. 2C are diagrams showing spot images on a light receiving surface of an imaging element of an imaging lens device, in which FIG. 2A is a diagram showing a spot image in a case where a focal point is deviated by 0.2 mm (defocus=0.2 mm), FIG. 2B is a diagram showing a spot image in a case of focus (best focus), and FIG. 2C is a diagram showing a spot image in a case where the focal point is deviated by −0.2 mm (defocus=−0.2 mm).

FIGS. 8A to 8C are explanatory diagrams of blurring restoration processing in the present embodiment.

FIG. 9A to FIG. 9D are diagrams showing examples of a pixel array of a monitor.

FIG. 15 is a diagram showing an example of storage data of a kernel data ROM (optical magnification).

FIG. 16 is a diagram showing another example of storage data of the kernel data ROM (F number).

FIG. 26A to FIG. 26C are diagrams showing spot images on the light receiving surface of the imaging element according to the present embodiment, in which FIG. 26A is a diagram showing a spot image in the case where the focal point is deviated by 0.2 mm (defocus=0.2 mm), FIG. 26B is a diagram showing a spot image in the case of focus (best focus), and FIG. 26C is a diagram showing a spot image in the case where the focal point is deviated by −0.2 mm (defocus=−0.2 mm).

FIG. 27A and FIG. 27B are diagrams for explaining an MTF of a first order image formed by the imaging element according to the present embodiment, in which FIG. 27A is a diagram showing a spot image on the light receiving surface of the imaging element of the imaging lens device, and FIG. 27B shows an MTF characteristic with respect to a spatial frequency.

DESCRIPTION OF NOTATIONS 100, 100A to 100C . . . imaging devices, 110, 110B, 110C . . . optical systems, 120 . . . imaging element, 130 . . . analog front end (AFE), 140 . . . switching unit, 140-1 . . . first switching unit, 140-2 . . . second switching unit, 150 . . . image processing device, 160 . . . camera signal processing unit, 190 . . . operating unit, 200 . . . exposure control device, 200B, 200C . . . system control devices, 210 . . . first filter, 220 . . . second filter, 111 . . . object side lens, 112 . . . imaging lens, 113 . . . wavefront forming optical element, 113a . . . phase plate (optical wavefront modulation element), 152 . . . convolution operation unit, 153 . . . kernel data ROM, and 154 . . . convolution control unit.

BEST MODE FOR CARRYING OUT THE INVENTION

Below, embodiments of the present invention will be explained with reference to the accompanying drawings.

Figure 3:
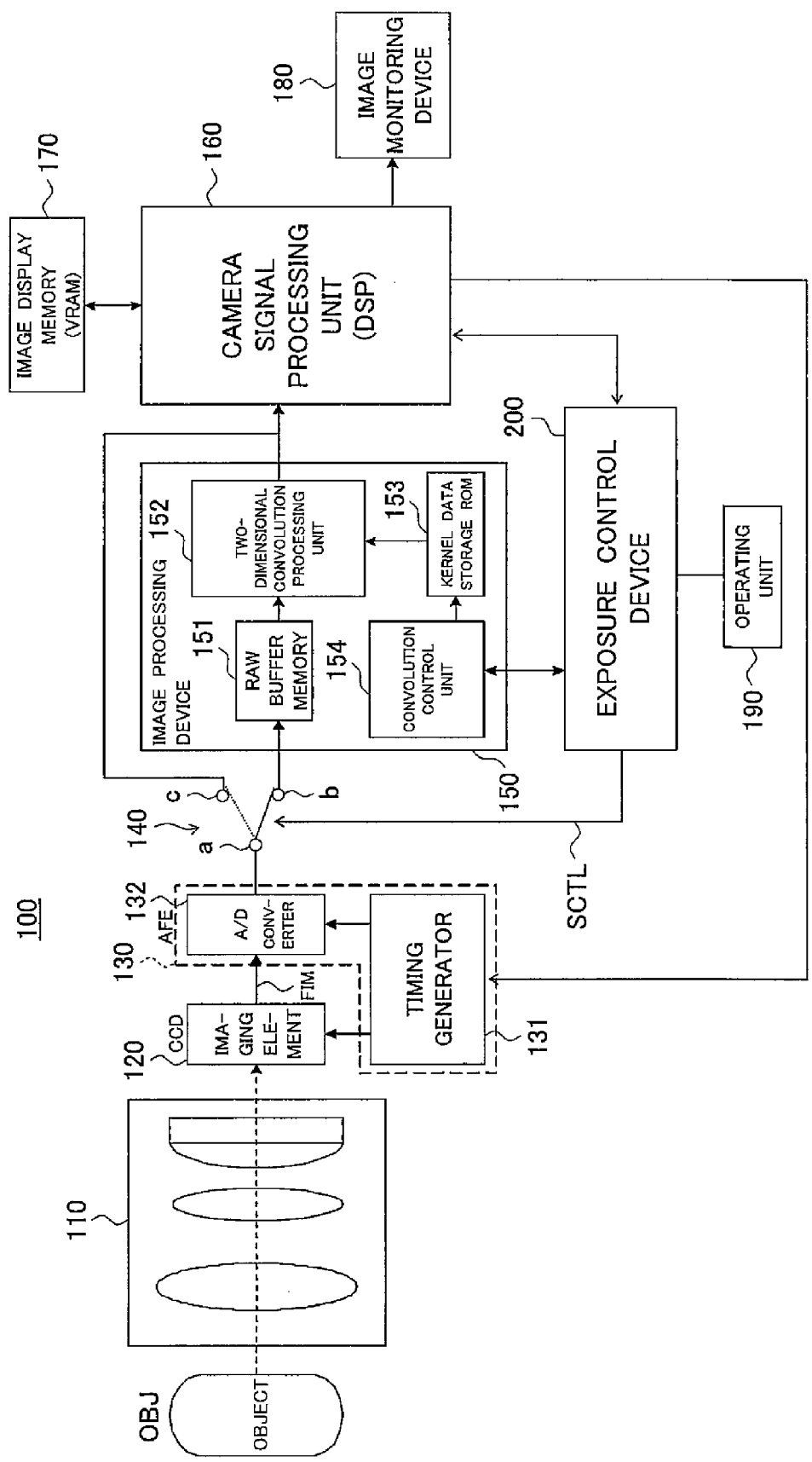
FIG. 3 is a block diagram showing the configuration of an imaging device according to a first embodiment of the present invention.

FIG. 3 is a block diagram showing the configuration of an imaging device according to a first embodiment of the present invention.

An imaging device 100 according to the present first embodiment has an optical system 110, imaging element 120, analog front end (AFE) 130, switching unit 140, a converting means comprised of an image processing device 150, camera signal processing unit 160, image display memory 170, image monitoring device 180, operating unit 190, and controlling means comprised of an exposure control device 200.

The optical system 110 supplies an image capturing an object OBJ to the imaging element 120.

The optical system 110 of the present embodiment includes an optical wavefront modulation element as will be explained later and is formed so that the amount of blurring of the focal point becomes substantially constant at the focus position and distances before and after the focus position.

The amount of blurring of this focal point is set using the resolution of the image monitoring device 180 as the upper limit.

The imaging element 120 is configured by a CCD or CMOS sensor in which the image fetched at the optical system 110 is formed and which outputs a formed first order image as a first order image signal FIM of a signal via the analog front end 130 to the switching unit 140.

In FIG. 3, the imaging element 120 is described as a CCD as an example.

The analog front end 130 has a timing generator 131 and an analog/digital (A/D) converter 132.

The timing generator 131 generates a drive timing of the CCD of the imaging element 120, and the A/D converter 132 converts the analog signal input from the CCD to a digital signal which it outputs to the switching unit 140.

The switching unit 140 selectively inputs the captured image signal of the imaging element 120 via the AFE 130 to the image processing device 150 or camera signal processing unit 160 in accordance with a switch control signal SCTL from the exposure control device 200.

In the switching unit 140, a fixed contact a is connected to an output line of the A/D converter 132 of the AFE 130, a working contact b is connected to an input line of the image processing device 150, and a working contact c is connected to a signal input line of the camera signal processing unit 160.

The switching unit 140 is controlled so that the fixed contact a is connected to the working contact c as "displaying a through image" when for example displaying a through image in the monitoring device 160. On the other hand, when capturing the image and storing an image in the memory 170, this is controlled so that the fixed contact a is connected to the working contact b.

The image processing device (two-dimensional convolution means) 150 functioning as the converting means receives as input the digital signal of the captured image coming from the AFE 130 in the front stage, applies two-dimensional convolution processing, and transfers the result to the camera signal processing unit (DSP) 160 in the latter stage.

The image processing device 150 performs the filtering on the optical transfer function (OTF) in accordance with the exposure information of the exposure control device 200. Note that, stop information is included as the exposure information.

The image processing device 150 generates an image signal restored by correcting the blurring of the focal point of the image from the imaging element 120. More concretely, the image processing device 150 has a function of generating a dispersion-free image signal from a dispersed image signal of an object from the imaging element 120. Further, the image processing device 150 has a function of applying noise reduction filtering in a first step (processing).

The processing of the image processing device 150 will be explained in further detail later.

The camera signal processing unit (DSP) 160 performs color interpolation, white balancing, YCbCr conversion processing, compression, filing, and other predetermined image processing and performs the storage into the memory 170, the image display in the image monitoring device 180, and so on.

The image monitoring device 180 displays for example a through image or capture image formed by a liquid crystal display device and subjected to predetermined image processing by the camera signal processing unit 160.

The resolution of the image monitoring device 180 is set to for example not more than 2 times of the pixel pitch of the image monitoring device 180.

The memory 170 stores the captured image etc. subjected to the predetermined image processing at the camera signal processing unit 160.

The operating unit 190 is configured by an input switch etc. for instructing the exposure control device 200 to perform a predetermined function control. The operating unit 190 includes switches for example a shutter button, release button, magnification button, up shift key, down shift key, right shift key, and left shift key.

The operating unit 190 has a trigger signal generation function for generating a trigger signal for instructing, when for example the shutter button or release button is operated by a user, capturing of a desired through image portion, storing it in the memory 170, and outputting the same to the exposure control device 200.

The exposure control device 200 performs exposure control and, at the same time, waits for operation inputs of the operating unit 190 etc., determines the operation of the overall system in accordance with these inputs, controls the AFE 130, image processing device 150, DSP 160 etc., and conducts mediation control of the overall system.

The exposure control device 200 connects the fixed contact a and working contact c of the switching unit 140 by the switch control signal CTL and directly inputs the captured image signal of the imaging element 120 not subjected to the restoration processing to the camera signal processing unit 160.

On the other hand, the exposure control device 200, when receiving the trigger signal from the operating unit 190, judges the mode is for capturing an image and storing the image in the memory 170, connects the fixed contact a and the working contact b of the switching unit 140 by the switch control signal SCTL, and inputs the image to the image processing device 150 so as to apply the restoration processing.

Namely, the exposure control device 200 performs the restoration processing for the image captured by receiving the trigger signal at the image processing device 150, then makes the image monitoring device 180 display the image after applying predetermined image processing at the camera signal processing unit 160.

Further, the exposure control device 200 issues, through for example the camera signal processing unit 160, an instruction to the timing generator 131 so as to output an image having a required sufficient resolution by the resolution of the image monitoring device 180 from the imaging element 120 during the display of the through image in the image monitoring device 180.

Below, the basic functions of the optical system of the present embodiment and the basic processing in accordance with presence/absence of the blurred image restoration will be explained, then the further concrete configurations and functions of the optical system 110 and the image processing device 150 functioning as the converting means serving as characterizing features of the present embodiment will be concretely explained.

Here, a general imaging optical system in which light rays are concentrated to the best focus (focal point) position will be explained as a comparative example.

Figure 4:
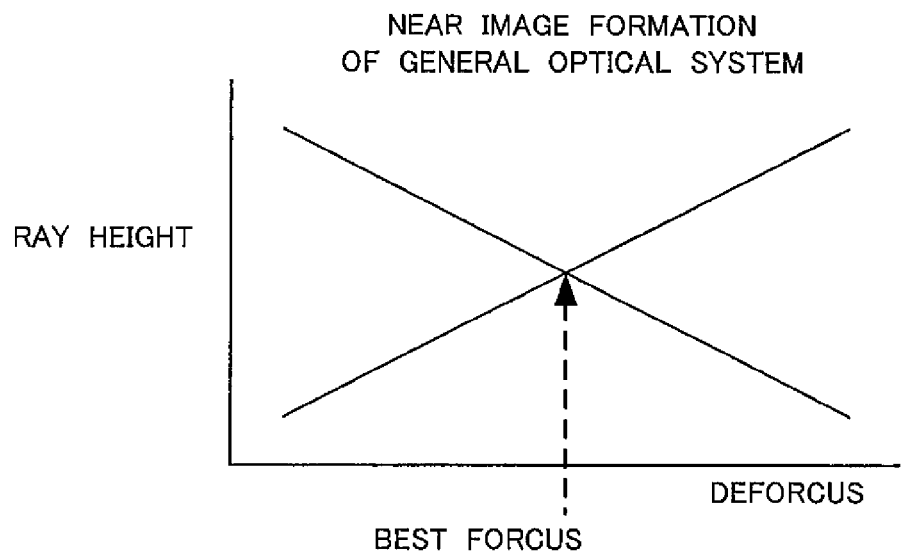
FIG. 4 is a diagram showing a relationship between a light ray height and defocus of a general imaging optical system.

FIG. 4 is a diagram showing a relationship between the light ray height and defocus of a general imaging optical system.

Figure 5:
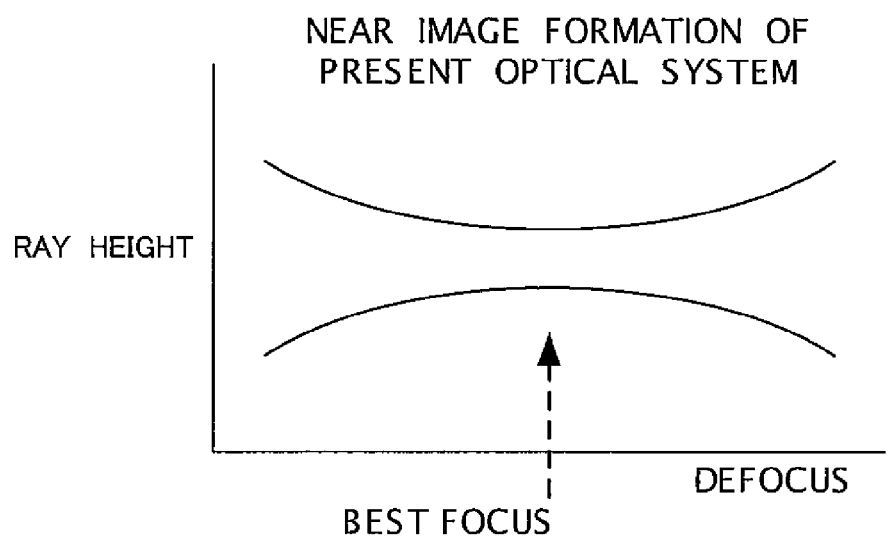
FIG. 5 is a diagram showing optical characteristics near the imaging of the optical system of the present embodiment.

Further, FIG. 5 is a diagram showing the optical characteristics near the image formed in the optical system of the present embodiment.

Figure 1:
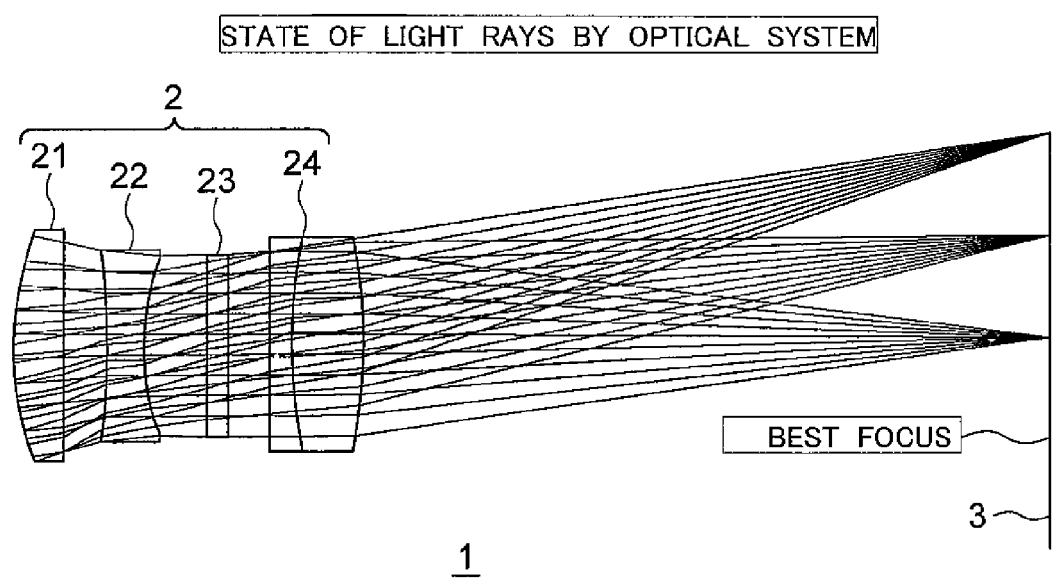
FIG. 1 is a diagram schematically showing the configuration of a general imaging lens device and a state of light rays.
Figure 2A:
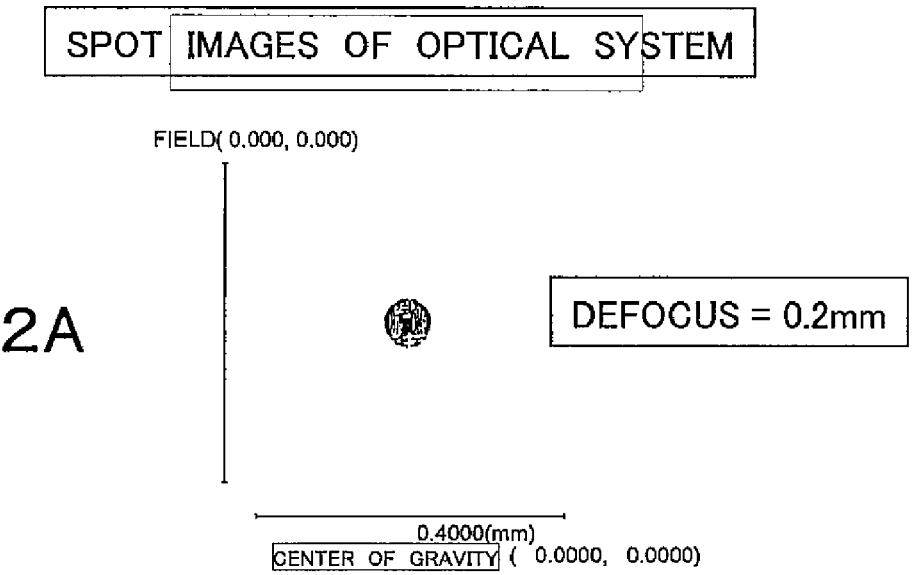
Figure 2B:
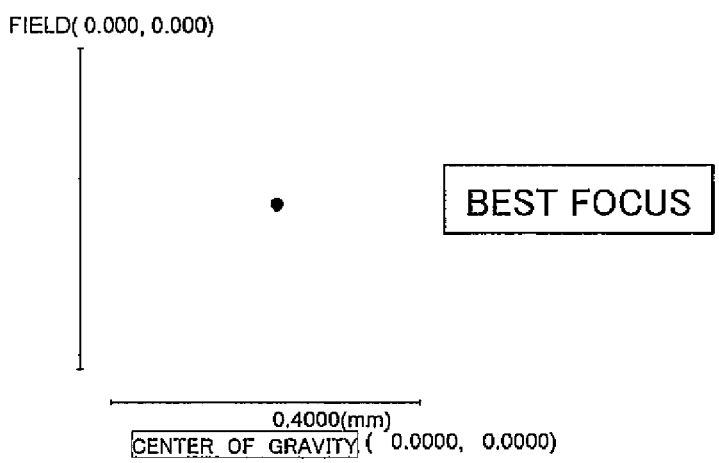
Figure 2C:
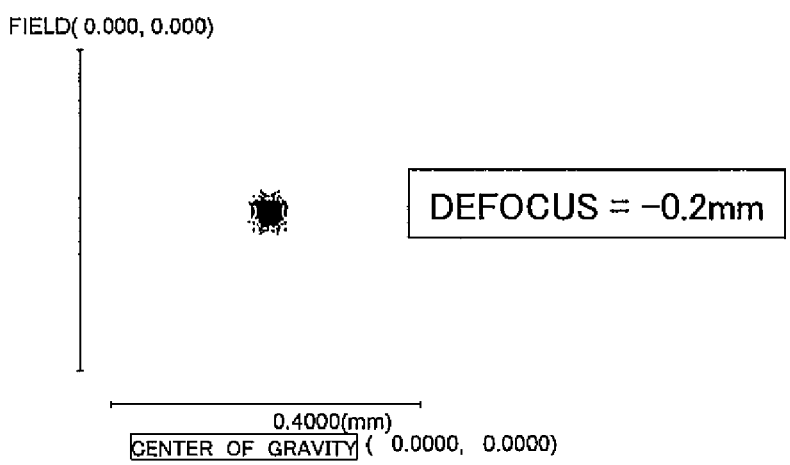

As shown in FIG. 2, in a general imaging optical system, light rays are concentrated with a highest density at the best focus position. The further from the best focus position, the greater the blurring diameter becomes substantially proportional to the amount of defocus.

Contrary to this, in the optical system 110 of the present embodiment, as shown in FIG. 5, unlike a general imaging optical system, light rays are not concentrated at the best focus position, therefore the image is blurred even at the best focus position. However, the optical system 110 of the present embodiment is designed so that the change of the shape of blurring (PSF) becomes duller with respect to the amount of defocus in the vicinity of this best focus.

Accordingly, when the blurring restoration processing is carried out in accordance with the PSF of the best focus position, the blurring is eliminated and a clear image can be obtained at the best focus point of course and also before and after it.

This is the principle of the increase of the depth employed in the present embodiment.

Next, the blurred image restoration processing will be explained.

Figure 6:
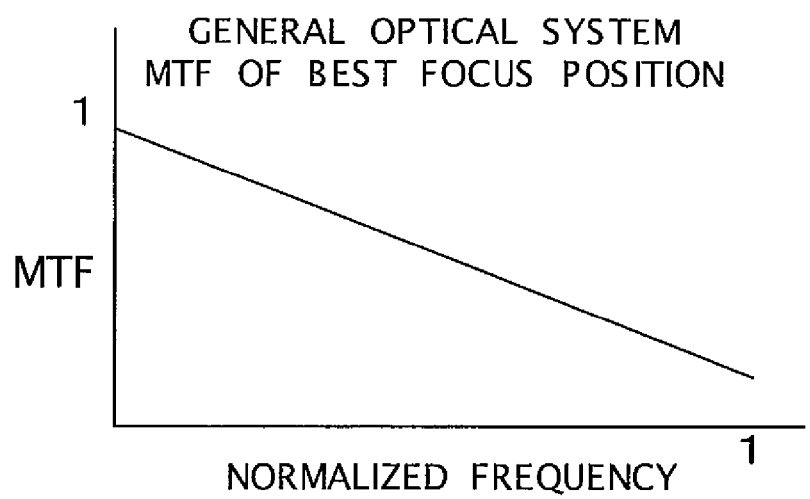
FIG. 6 is a graph of the MTF (Modulation Transfer Function) characteristic at a best focus position of a general optical system.

FIG. 6 is a graph of the MTF (Modulation Transfer Function) characteristic at the best focus position of a general optical system.

Figure 7:
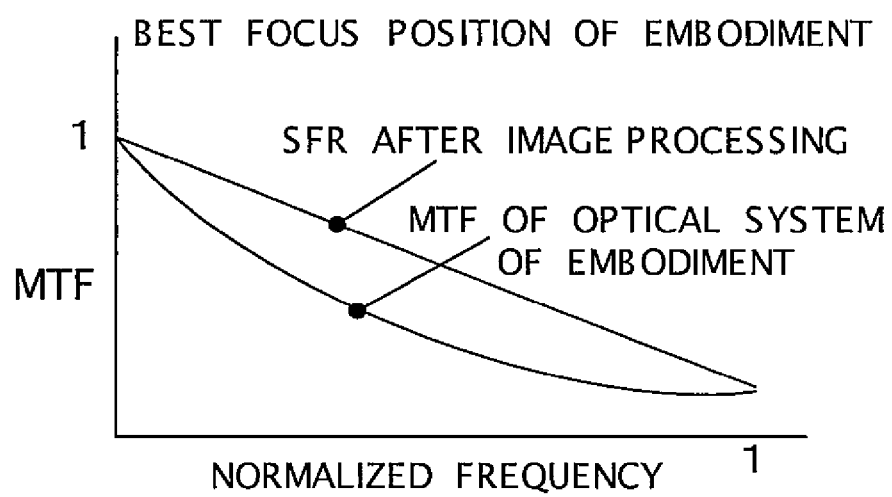
FIG. 7 is a diagram showing the MTF characteristic of the optical system of the present embodiment.

FIG. 7 is a diagram showing the MTF characteristic of an optical system of the present embodiment.

The captured image passing through the optical system 110 of the present embodiment and obtained at the imaging element 120 is blurred, therefore the MTF is lowered from a medium frequency zone to a high frequency zone. This MTF is raised by the processing. As compared with the MTF which is an amplitude characteristic of a lens itself, the total amplitude characteristic including the image processing is referred to as the "SFR (Spatial Frequency Response)".

The frequency characteristic of the PSF causing a blurred image is the MTF, therefore a filter formed designed to a gain characteristic raising the frequency characteristic from this up to a desired SFR characteristic is a blurring restoration filter. How much gain is to be set is determined by the balance with noise and false images.

The method of applying digital filtering to an original image by this blurring restoration filter includes a method of applying a Fourier transform to the image and taking the product with the filter in a frequency domain for each frequency and a method of performing a convolution operation in a spatial domain. Here, the latter realization method will be explained. The convolution operation is represented by the following equation.

$$B_{i,j} = \sum_{l=-n}^{+n} \sum_{k=-n}^{+n} f_{(k,l)} * A_{(i+k,j+l)}$$ [Equation 1]

Here, f indicates a filter kernel (here, for facilitating the calculations, use is made of a filter already rotated by 180 degrees).

Further, A indicates the original image, and B indicates a filtered image (blurring restored image).

As seen from this equation, the result of superposing the kernel f on the image and adding products of taps with each other is defined as the value of the center coordinates of superimposition.

Next, a concrete explanation will be given with reference to FIG. 8A to FIG. 8C by taking as an example a 3*3 filter.

The restoration filter (already rotated by 180 degrees) of FIG. 8A is superimposed on A(i,j) of the blurred image shown in FIG. 8B at the center f(0,0) of the filter, the products of taps with each other are taken, and the value of the sum of these nine products is defined as the B(i,j) of the blurring restored image shown in FIG. 8C.

When scanning (i,j) over the overall image, a new B image is generated. This is a digital filter. Here, the filter is used for the purpose of restoring blurring. Therefore, by performing this processing, the blurring restoration processing can be executed.

Theoretically and technically, it is possible to constantly apply this processing and display the image subjected to the blurring restoration processing even during the display of a through image.

However, when trying to perform this convolution processing in real time while maintaining a high rate for example 30 fps, a line buffer in accordance with the filter size and very many multipliers become necessary, so the costs are high and a large power consumption occurs, so this is not very realistic.

Therefore, in the present first embodiment, the convolution operation is not performed during a period where it is not necessary such as during the display of a through image. The convolution operation is applied only at the time when the trigger of capture execution is input.

In the present first embodiment, the image passes through the optical system 110 and is converted to an electrical signal by the imaging element 120, then is converted at the AFE 130 to generate digital image data.

Then, during the display of the through image, the image signal from the imaging element 120 is sent to the camera signal processing unit 160 while bypassing the blurred image restoration processing of the image processing device 150 by the switching unit 140.

The camera signal processing unit 160, in for example a case of Bayer color, performs de-mosaic processing, white balance processing, gamma processing, YUV conversion, etc. and outputs the image to the monitor in real time.

Next, when the trigger signal is input to the exposure control device 200 by operation of for example the release button of the operating unit 190, the digital data from the imaging element 120 and AFE 130 is input to the image processing device 150 by the switching unit 140 and subjected to the blurred image restoration processing explained before, then the camera signal processing is applied to the output thereof at the camera signal processing unit 160. The image subjected to the camera signal processing is stored in the memory 170 or displayed in the image monitoring device 180.

Here, when the magnification button is depressed, the captured image is magnified and projected on the monitor. The position of the magnified portion can be changed by the operation of the shift key in that state as well.

Further, in the present embodiment, the extent of blurring of the PSF is set using the resolution of the image monitoring device 180 as the upper limit. Therefore, even if not performing the blurring restoration processing explained above in order to lighten the processing during the display of a through image, monitor display where blurring is not remarkable becomes possible.

Further, in the present embodiment, the magnitude of the extent of the blurring is set to not more than 2 times the pixel pitch of the image monitoring device 180, therefore a live image in the through image is not substantially blurred.

The display is not substantially blurred when the extent of blurring is not more than about 2 times of the image pitch because, in general, when displaying color on a monitor device, the three primary colors R, G, and B of the light are individually assigned to pixels and the color is displayed using at least these three pixels as units.

As shown in FIG. 9A to FIG. 9D, there are a plurality of techniques for the array of pixels including a stripe array, diagonal array, delta array, and rectangle array, but in each technique, the image is formed by pixels in squares each having a size of at least 2×2 as the minimum unit.

Accordingly, the resolution of the monitor display image of 2 times or less of the pixel pitch can be mentioned to be a level not substantially causing any problem.

Further, in the present embodiment, a blurred image is processed for restoration at the image processing device 150, and the blurring restored image is automatically output to the image monitoring device 180 at the time when the camera signal processing ends at the camera signal processing unit 160. Therefore, even when a certain degree of time is taken for the blurring restoration processing, the result can be seen simultaneously with the end of the processing, so a photographer does not have to perform a special operation for executing the restoration processing.

Further, in the present embodiment, during the display of a through image, an image having a required sufficiently small size in terms of the resolution of the image monitoring device 180 is subjected to the camera signal processing without passing through the blurring converting means constituted by the image processing device of the imaging element 120 and then is output to the image monitoring device 180, therefore a load is not applied in the image processing and it becomes possible to perform processing in real time and at a high speed.

Below, the configurations and functions of the optical system and image processing device of the present embodiment will be further concretely explained.

Figure 10:
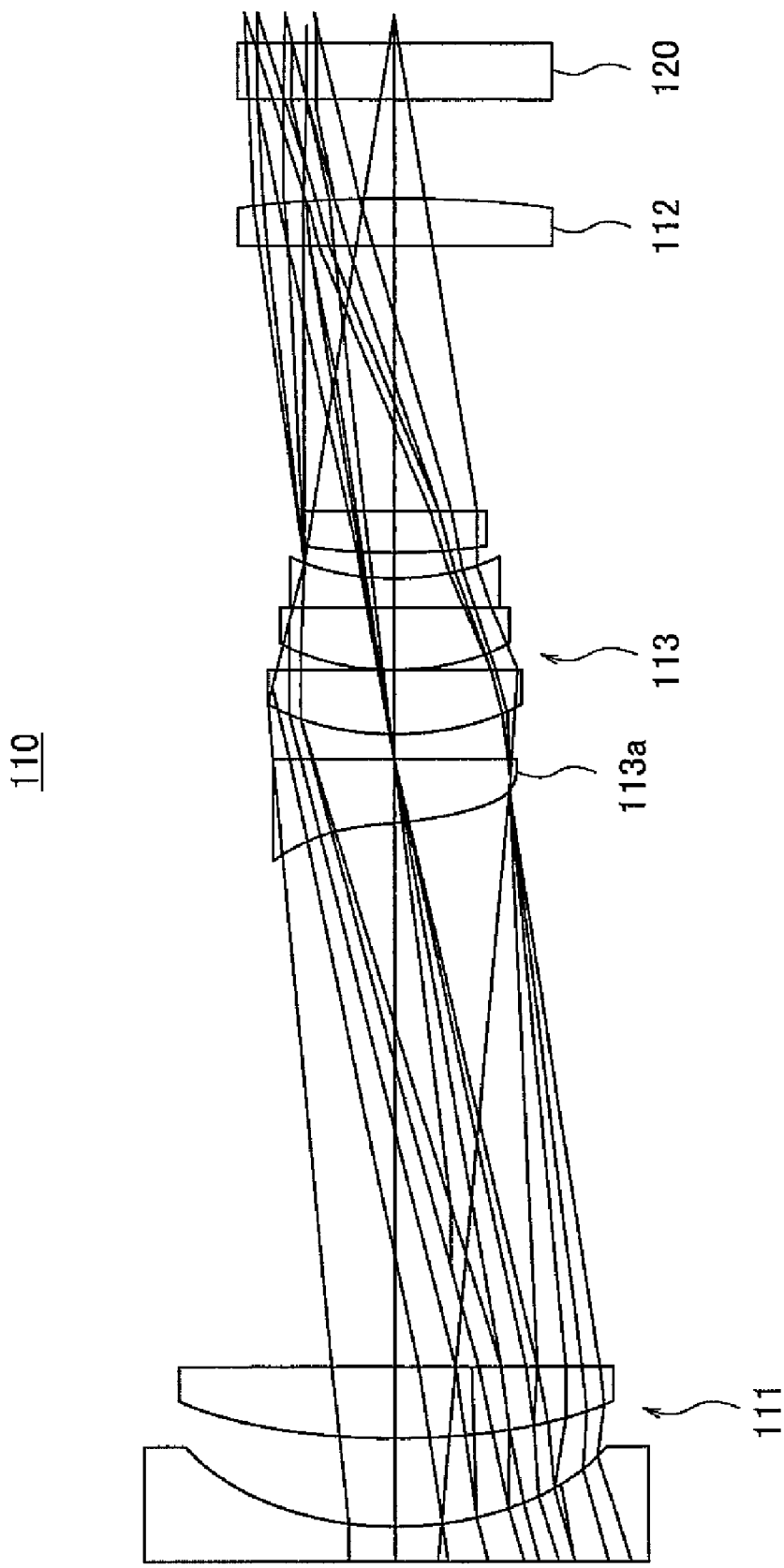
FIG. 10 is a diagram schematically showing an example of the configuration of a zoom optical system on a wide angle side of the imaging lens device according to the present embodiment.

FIG. 10 is a diagram schematically showing an example of the configuration of the zoom optical system 110 according to the present embodiment.

Figure 11:
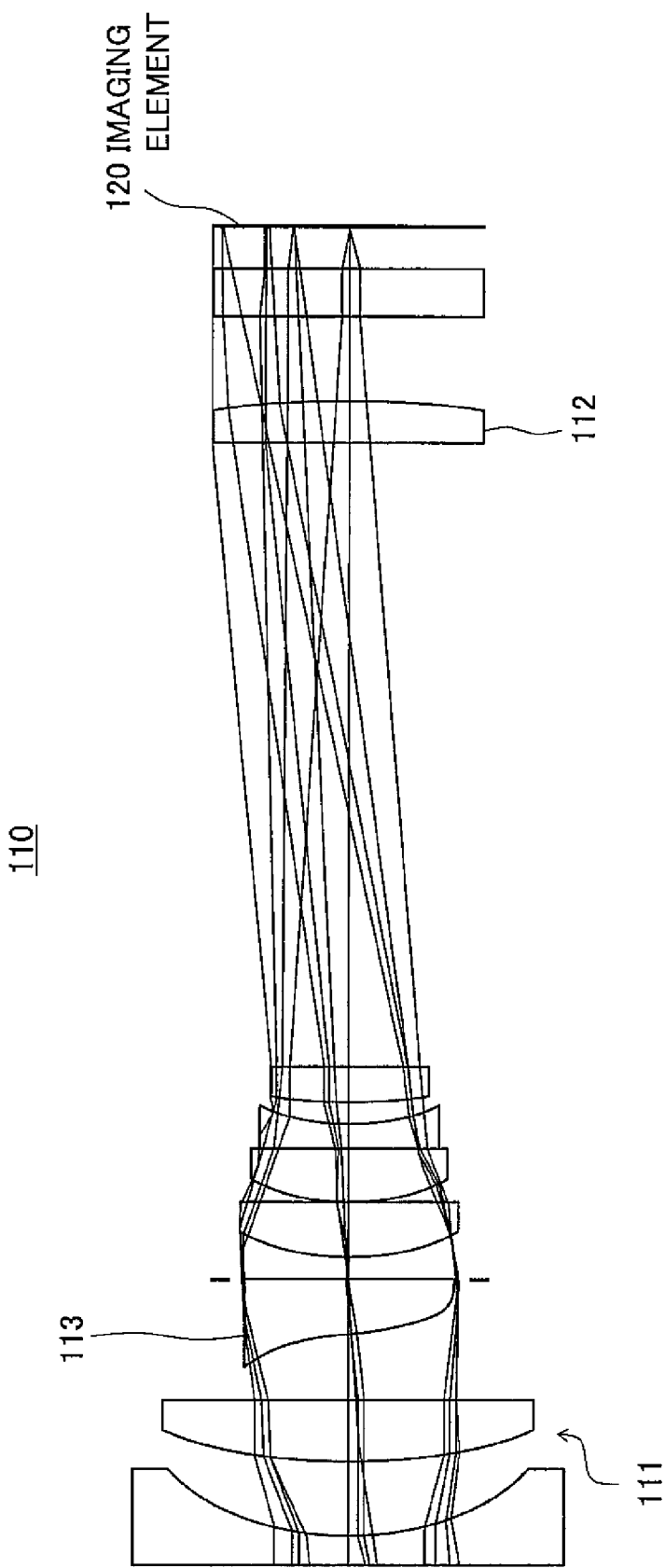
FIG. 11 is a diagram schematically showing an example of the configuration of the zoom optical system on a telescopic side of the imaging lens device according to the present embodiment.

Further, FIG. 11 is a diagram schematically showing an example of the configuration of the zoom optical system on the telescopic side of the imaging lens device according to the present embodiment.

Figure 12:
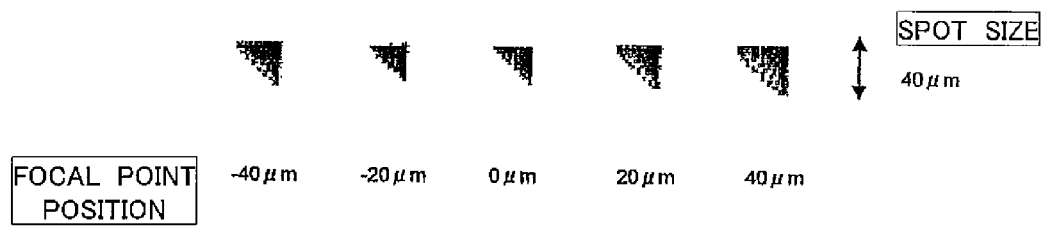
FIG. 12 is a diagram showing a spot shape at the center of image height on the wide angle side.
Figure 13:
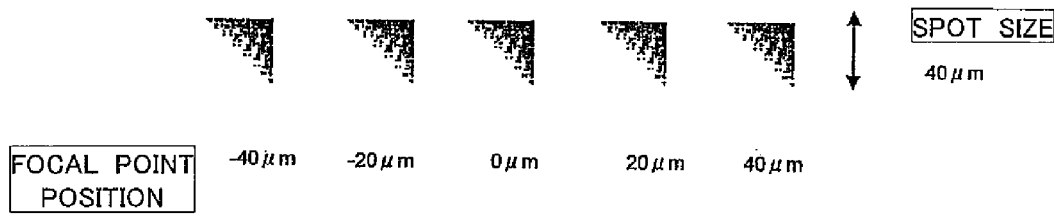
FIG. 13 is a diagram showing a spot shape at the center of image height on the telescopic side.

Furthermore, FIG. 12 is a diagram showing a spot shape at the center of image height on the wide angle side of the zoom optical system according to the present embodiment, and FIG. 13 is a diagram showing a spot shape at the center of image height on the telescopic side of the zoom optical system according to the present embodiment.

The zoom optical system 110 of FIG. 10 and FIG. 11 has an object side lens 111 arranged on the object side OBJS, an imaging lens 112 for forming an image in the imaging element 120, and an optical wavefront modulation element (wavefront coding optical element) group 113 arranged between the object side lens 111 and the imaging lens 112 and including a phase plate (cubic phase plate) deforming the wavefront of the image formed on the light receiving surface of the imaging element 120 by the imaging lens 112 and having for example a three-dimensional curved surface. Further, a not shown stop is arranged between the object side lens 111 and the imaging lens 112.

For example, in the present embodiment, a variable stop is provided, and a stop degree (opening degree) of the variable a stop is controlled in the exposure control (device).

Note that, in the present embodiment, the explanation was given for the case where a phase plate was used, but the optical wavefront modulation elements of the present invention may include any elements so far as they deform the wavefront. They may include optical elements changing in thickness (for example, the above-explained third order phase plate), optical elements changing in refractive index (for example, a refractive index distribution type wavefront modulation lens), optical elements changing in thickness and refractive index by coating on the lens surface (for example, a wavefront coding hybrid lens), liquid crystal devices able to modulate the phase distribution of the light (for example, liquid crystal spatial phase modulation devices), and other optical wavefront modulation elements.

The zoom optical system 110 of FIG. 10 and FIG. 11 is an example of inserting an optical phase plate 113*a* into a 3× zoom system used in a digital camera.

The phase plate 113*a* shown in the figure is an optical lens regularly dispersing the light rays converged by the optical system. By inserting this phase plate, an image not focused anywhere on the imaging element 120 is realized.

In other words, the phase plate 113*a* forms light rays having a deep depth (playing a central role in the image formation) and flare (blurred portion).

A means for restoring this regularly dispersed image to a focused image by digital processing will be referred to as a "wavefront aberration control optical system" or a depth expansion optical system (DEOS). This processing is carried out in the image processing device 150.

Here, the basic principle of the DEOS will be explained.

Figure 14:
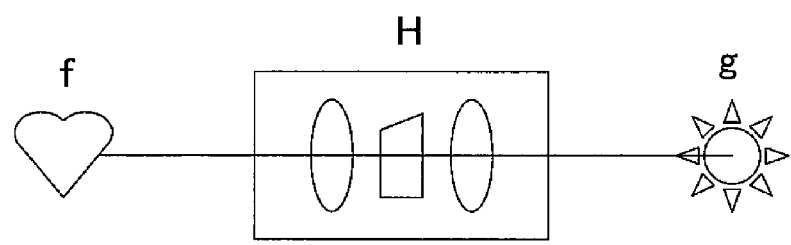
FIG. 14 is a diagram for explaining a principle of a DEOS.

As shown in FIG. 14, an image f of an object enters into the optical system H of the DEOS optical system H, whereby a g image is generated.

This is represented by the following equation:

$$g = H*f \qquad \text{(Equation 2)}$$

Where, * represents convolution.

In order to find the object from the generated image, the following processing is required:

$$f = H^{-1}*g \qquad \text{(Equation 3)}$$

Here, the kernel size and operational coefficient concerning the H will be explained.

The zoom positions are defined as Zpn, Zpn-1, . . . Further, the H functions of these are defined as Hn, Hn-1, . . .

The spots are different, therefore the H functions become as follows:

$$Hn = \begin{pmatrix} a & b & c \\ d & e & f \end{pmatrix} \qquad \text{[Equation 4]}$$

$$Hn-1 = \begin{pmatrix} a' & b' & c' \\ d' & e' & f' \\ g' & h' & i' \end{pmatrix}$$

The difference of the number of rows and/or the number of columns of this matrix is referred to as the "kernel size". The numbers are the operational coefficients.

Here, it is possible to store each H function in the memory or define the PSF as a function of the object distance, calculate it according to the object distance, and thereby calculate the H function so as to create the optimum filter for any object distance. Further, it is possible to use the H function as a function of the object distance and directly find the H function according to the object distance.

In the present first embodiment, as shown in FIG. 3, the device is configured to receive an image from the optical system 110 at the imaging element 120, input it to the image processing device 150, acquire a conversion coefficient in accordance with the optical system, and use the acquired conversion coefficient to generate a dispersion-free image signal from a dispersed image signal from the imaging element 120.

Note that, in the present embodiment, "dispersion" means the phenomenon where, as explained above, inserting the phase plate 113*a* causes the formation of an image not focused anywhere on the imaging element 120 and the formation of light rays having a deep depth (playing a central role in the image formation) and flare (blurred portion) by the phase plate 113*a* and includes the same meaning as aberration because of the behavior of the image being dispersed and forming a blurred portion. Accordingly, in the present embodiment, there also exists a case where dispersion is explained as aberration.

Next, the configuration and processing of the image processing device 150 will be explained.

The image processing device 150, as shown in FIG. 3, has a raw buffer memory 151, a convolution operation unit 152, a kernel data storage ROM 153 as a storing means, and a convolution control unit 154.

The convolution control unit 154 controls the ON/OFF state of the convolution processing, screen size, replacement of kernel data, etc. and is controlled by the exposure control device 200.

Further, the device stores the convolution use kernel data calculated by the PSF of each optical system prepared in advance in the kernel data storage ROM 153, as shown in FIG. 15 or FIG. 16, acquires the exposure information determined at the time of the setting the exposure by the exposure control device 200, and selects and controls the kernel data through the convolution control unit 154.

Note that, the exposure information includes the stop information.

In the example of FIG. 15, the kernel data A becomes data corresponding to an optical magnification (×1.5), the kernel data B becomes data corresponding to an optical magnification (×5), and the kernel data C becomes data corresponding to an optical magnification (×10).

Further, in the example of FIG. 16, the kernel data A becomes data corresponding to an F number (2.8) as the stop information, the kernel data B becomes data corresponding to an F number (4), and the kernel data C becomes data corresponding to an F number (5.6).

As in the example of FIG. 16, the filtering is carried out in accordance with the stop information for the following reason.

In a case of capturing an image while closing the a stop, the phase plate 113a forming the optical wavefront modulation element is covered by the stop and the phase changes, so it becomes difficult to restore a proper image.

Therefore, in the present embodiment, as in the present example, proper image restoration is realized by performing the filtering in accordance with the stop information in the exposure information.

Figure 17:
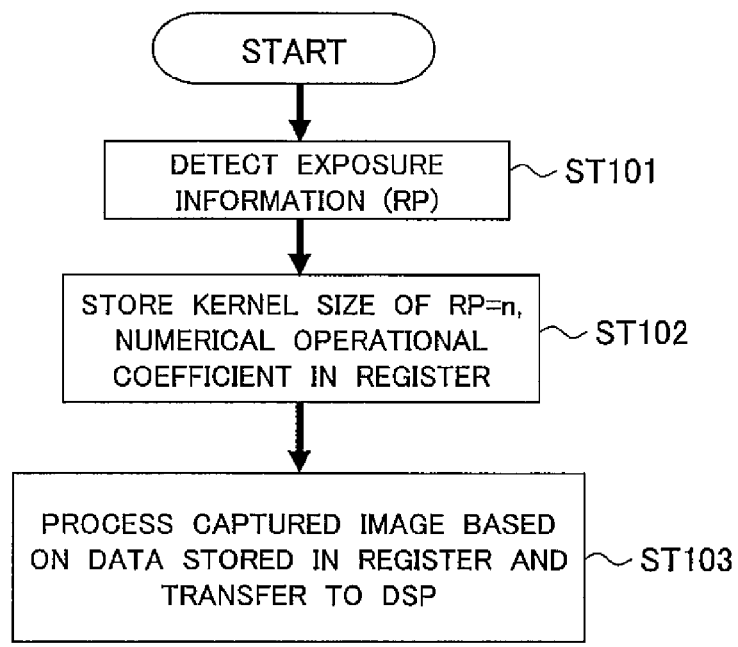
FIG. 17 is a flow chart schematically showing processing for setting an optical system of an exposure control device.

FIG. 17 is a flow chart of switching according to the exposure information (including elimination of stop) of the exposure control device 200.

First, the exposure information (RP) is detected and supplied to the convolution control unit 154 (ST101).

In the convolution control unit 154, from the exposure information RP, the kernel size and numerical operational coefficient are set in a register (ST102).

Then, the image data captured by the imaging element 120 and input to the two-dimensional convolution operation unit 152 via the AFE 130 is subjected to a convolution operation based on the data stored in the register. The processed and converted data is transferred to the camera signal processing unit (DSP) 160 (ST103).

Below, a further concrete example of the signal processing unit and kernel data storage ROM of the image processing device 150 will be explained.

Figure 18:
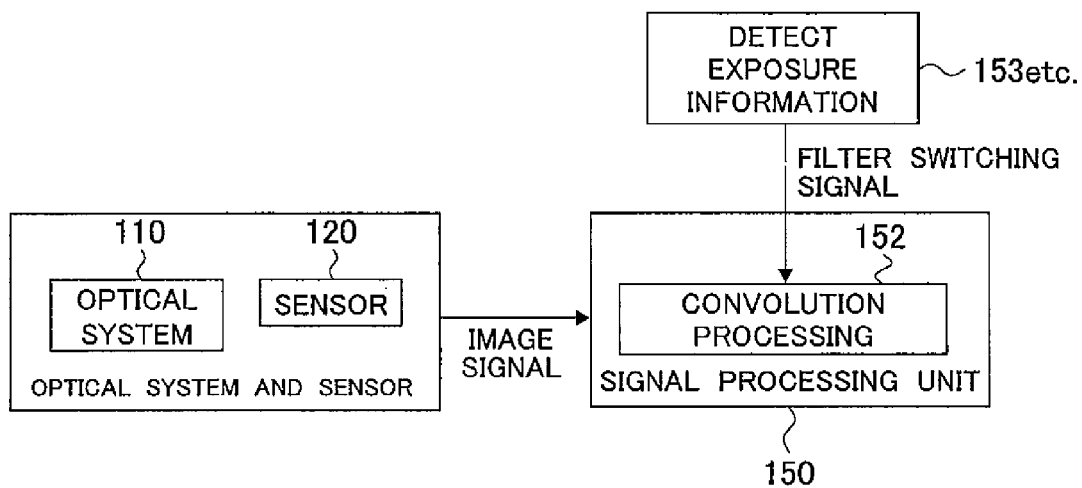
FIG. 18 is a diagram showing a first example of the configuration of a signal processing unit and the kernel data storage ROM.

FIG. 18 is a diagram showing a first example of the configuration for the signal processing unit and kernel data storage ROM. Note that, for simplification, the AFE etc. are omitted.

The example of FIG. 18 is a block diagram of the case where a filter kernel is prepared in advance in accordance with the exposure information.

The signal processing unit acquires exposure information determined at the time of setting the exposure and selects and controls the kernel data through the convolution control unit 154. The two-dimensional convolution operation unit 152 applies the convolution processing by using the kernel data.

Figure 19:
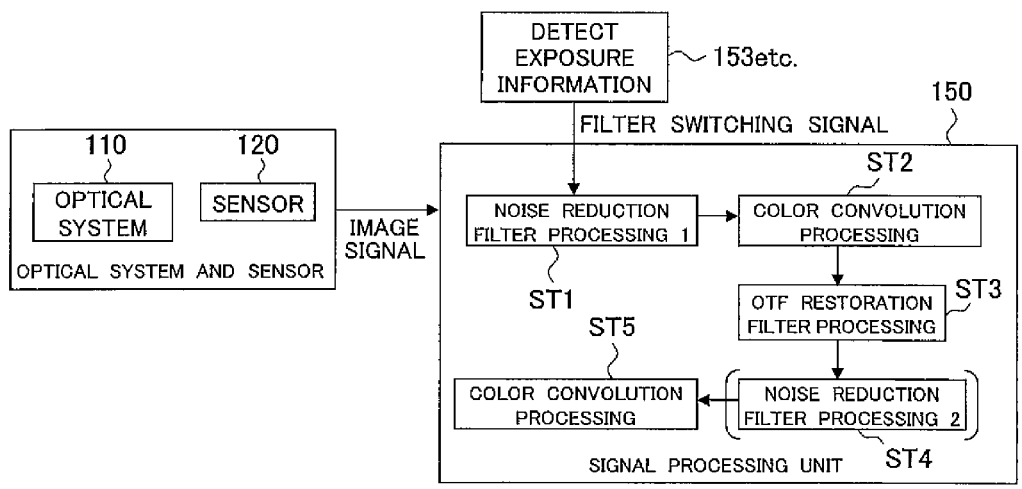
FIG. 19 is a diagram showing a second example of the configuration of a signal processing unit and the kernel data storage ROM.

FIG. 19 is a diagram showing a second example of the configuration for the signal processing unit and kernel data storage ROM. Note that, for simplification, the AFE etc. are omitted.

The example of FIG. 19 is a block diagram of the case where a step of noise reduction filtering is provided at the start of the signal processing unit, and noise reduction filtering ST1 in accordance with the exposure information is prepared in advance as the filter kernel data.

The signal processing unit acquires the exposure information determined at the time of setting the exposure and selects and controls the kernel data through the convolution control unit 154.

The two-dimensional convolution operation unit 152, after application of the noise reduction filter ST1, converts the color space by the color conversion processing ST2, then applies the convolution processing ST3 using the kernel data after that.

The signal processing unit performs the noise processing ST4 again and returns the converted color space to the original color space by the color conversion processing ST5. As the color conversion processing, for example YCbCr conversion can be mentioned, but the other conversion may be employed as well.

Note that it is also possible to omit the second noise processing ST4.

Figure 20:
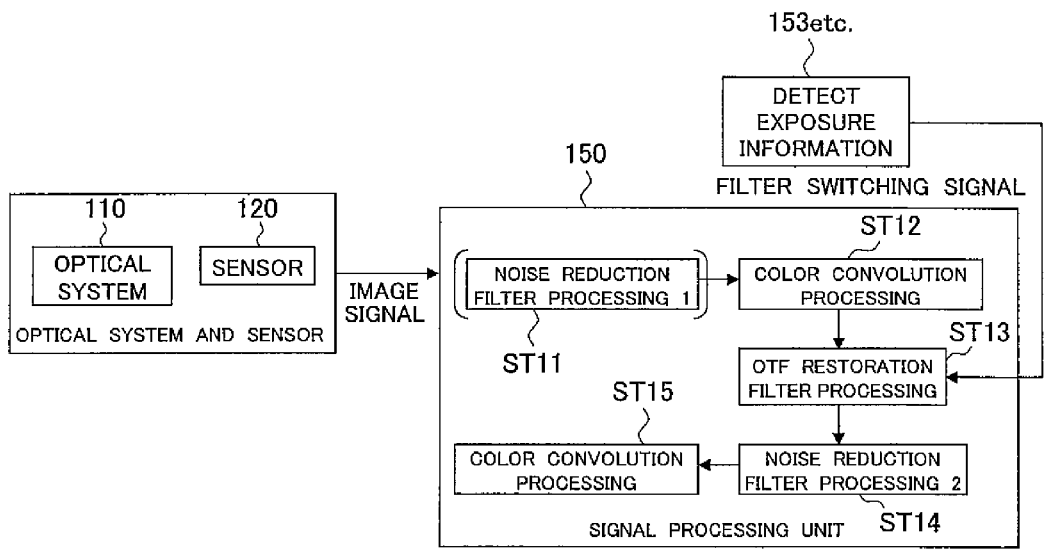
FIG. 20 is a diagram showing a third example of the configuration of a signal processing unit and the kernel data storage ROM.

FIG. 20 is a diagram showing a third example of the configuration for the signal processing unit and kernel data storage ROM. Note that, for simplification, the AFE etc. are omitted.

The example of FIG. 20 is a block diagram of the case where an OTF restoration filter is prepared in advance in accordance with the exposure information.

The signal processing unit acquires the exposure information determined at the time of setting the exposure and selects and controls the kernel data through the convolution control unit 154.

The two-dimensional convolution operation unit 152, after the noise reduction processing ST11 and color conversion processing ST12, applies the convolution processing ST13 by using the OTF restoration filter.

The signal processing unit performs the noise processing ST14 again and returns the converted color space to the original color space by the color conversion processing ST15. As the color conversion processing, for example the YCbCr conversion can be mentioned, but other conversion may be employed as well.

Note that it is also possible to omit the second noise processing ST14.

Figure 21:
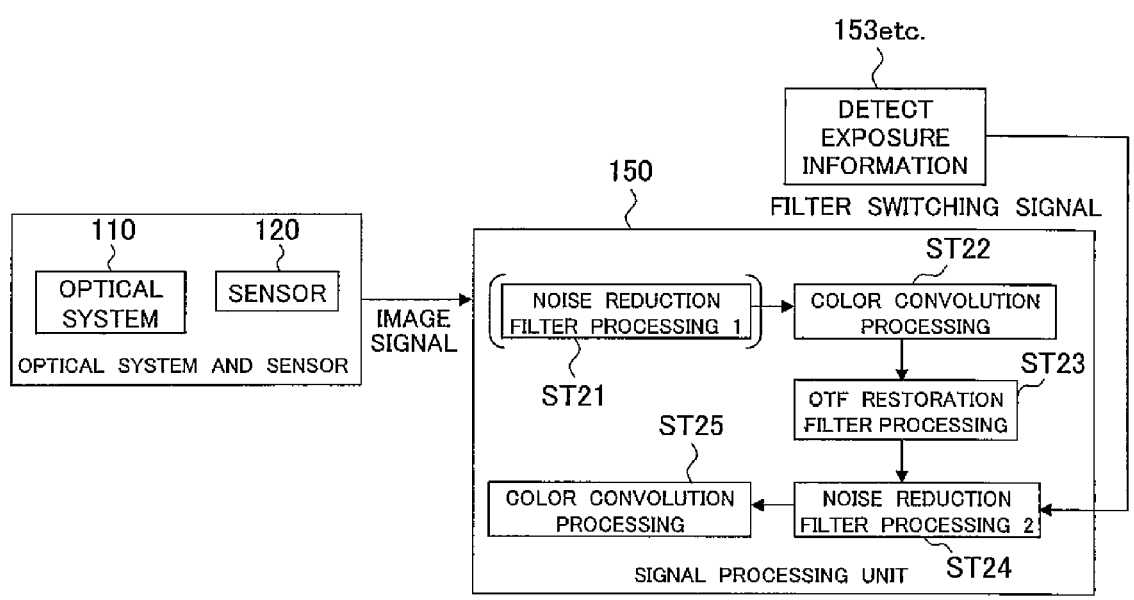
FIG. 21 is a diagram showing a fourth example of the configuration of a signal processing unit and the kernel data storage ROM.

FIG. 21 is a diagram showing a fourth example of the configuration for the signal processing unit and kernel data storage ROM. Note that, for simplification, the AFE etc. are omitted.

The example of FIG. 21 is a block diagram of the case where a step of noise reduction filtering is provided, and a noise reduction filter is prepared in advance as the filter kernel data in accordance with the exposure information.

The signal processing unit acquires the exposure information determined at the time of setting the exposure and selects and controls the kernel data through the convolution control unit 154.

The two-dimensional convolution operation unit 152, after application of the noise reduction filter ST21, converts the color space by the color conversion processing ST22, then applies the convolution processing ST23 by using the kernel data.

The signal processing unit carries out noise processing ST24 in accordance with the exposure information again and returns the converted color space to the original color space by the color conversion processing ST25. As the color conversion processing, for example, YCbCr conversion can be mentioned, but other conversion may be employed as well.

Note that it is also possible to omit the second noise processing ST24.

Above, an example of the two-dimensional convolution operation unit 152 performing the filtering in accordance with only the exposure information was explained, but by combining for example the object distance information, zoom information, or image capturing mode information and the exposure information, it becomes possible to extraction or process a suitable operational coefficient.

Figure 22:
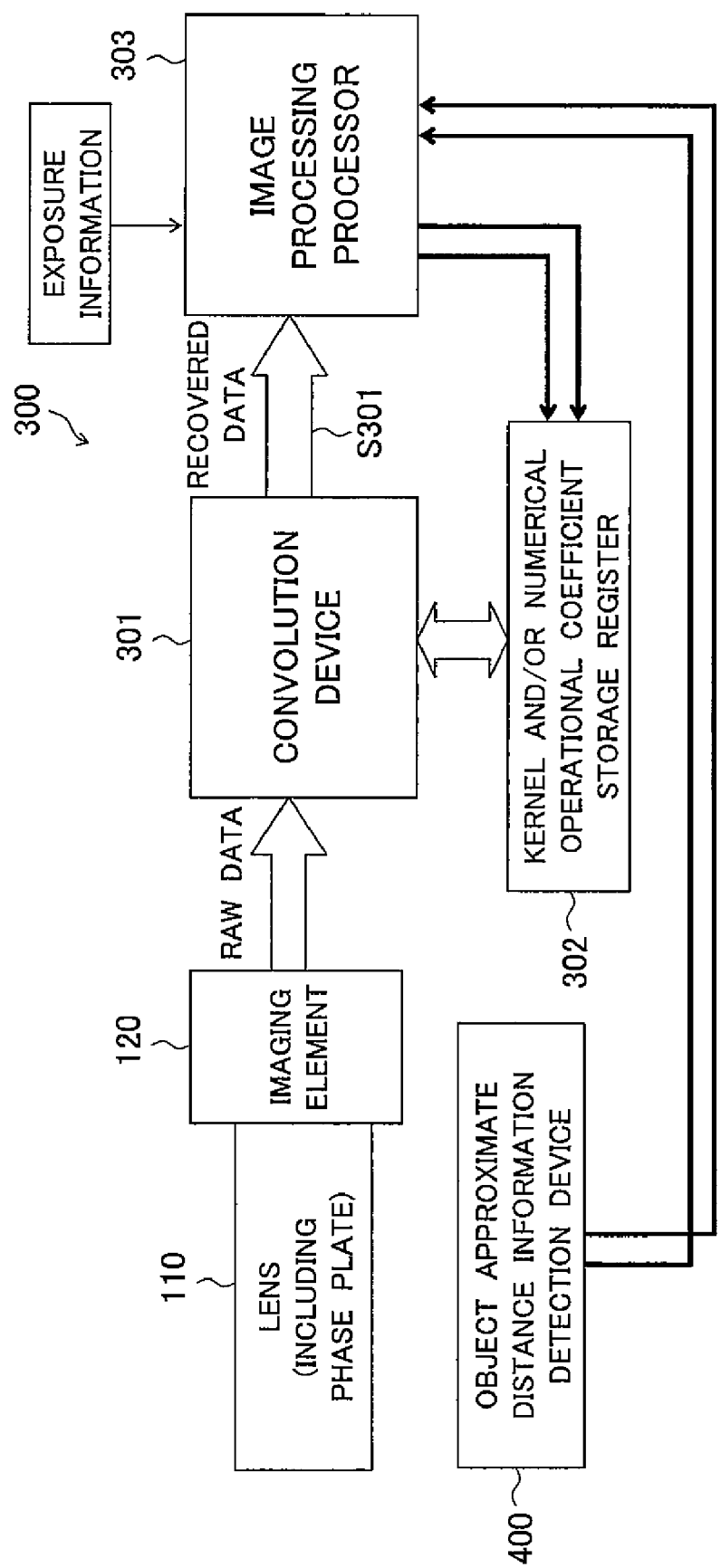
FIG. 22 is a diagram showing an example of the configuration of an image processing device combining object distance information and exposure information.

FIG. 22 is a diagram showing an example of the configuration of an image processing device combining object distance information and exposure information.

FIG. 22 shows an example of the configuration of an image processing device 300 for generating a dispersion-free image signal from a dispersed image signal of an object from the imaging element 120.

The image processing device 300, as shown in FIG. 22, has a convolution device 301, a kernel and/or numerical operational coefficient storage register 302, and an image processing processor 303.

In this image processing device 300, the image processing processor 303 obtains information concerning the approximate distance of the object distance of an object read out from an object approximate distance information detection device 400 and exposure information. It stores the kernel size and its operational coefficients used in suitable operation for the object distance position in the kernel and/or numerical operational coefficient storage register 302 and performs the suitable operation by the convolution device 301 by using those values to restore the image.

As explained above, in the case of an imaging device having a phase plate (wavefront coding optical element) as an optical wavefront modulation element, if within a predetermined focal distance range, a suitable aberration-free image signal can be generated by image processing concerning that range, but if out of the predetermined focal length range, there is a limit to the correction of the image processing, therefore only an object out of the above range ends up becoming an image signal with aberration.

Further, on the other hand, by applying image processing not causing aberration within a predetermined narrow range, it also becomes possible to give blurriness to an image out of the predetermined narrow range.

The present example is configured so as to detect the distance up to the main object by the object approximate distance information detection device 400 including a distance detection sensor and perform processing for image correction different in accordance with the detected distance.

The above image processing is carried out by convolution operation. In order to accomplish this, for example, it is possible to commonly store one type of operational coefficient of the convolution operation, store in advance a correction coefficient in accordance with the focal length, correct the operational coefficient by using this correction coefficient, and perform suitable convolution operation by the corrected operational coefficient.

Other than this configuration, it is possible to employ the following configurations.

It is possible to employ a configuration storing in advance the kernel size and the operational coefficient itself of the convolution in accordance with the focal length and perform a convolution operation by these stored kernel size and operational coefficient, a configuration storing in advance the operational coefficient in accordance with a focal length as a function, finding the operational coefficient by this function according to the focal length, and performing the convolution operation by the calculated operational coefficient, and so on.

When linked with the configuration of FIG. 22, the following configuration can be employed.

At least two conversion coefficients corresponding to the aberration due to at least the phase plate 113a are stored in advance in the conversion coefficient storing means constituted by the register 302 in accordance with the object distance. The image processing processor 303 functions as the coefficient selecting means for selecting a conversion coefficient in accordance with the distance up to the object from the register 302 based on the information generated by the object distance information generating means constituted by the object approximate distance information detection device 400.

Furthermore, the converting means constituted by the convolution device 301 converts the image signal according to the conversion coefficient selected at the coefficient selecting means constituted by the image processing processor 303.

Alternatively, as explained above, the conversion coefficient processing means constituted by the image processing processor 303 processes the conversion coefficient based on the information generated by the object distance information generating means constituted by the object approximate distance information detection device 400 and stores the result in the register 302.

Furthermore, the converting means constituted by the convolution device 301 converts the image signal according to the conversion coefficient obtained by the conversion coefficient processing means constituted by the image processing processor 303 and stored in the register 302.

Alternatively, the correction value storing means constituted by the register 302 stores at least one correction value in accordance with the zoom position or zoom amount of the zoom optical system 110 in advance. This correction value includes the kernel size of the object aberration image.

The register 302, functioning also as the second conversion coefficient storing means, stores in advance the conversion coefficient corresponding to the aberration due to the phase plate 113a.

Then, based on the distance information generated by the object distance information generating means constituted by the object approximate distance information detection device 400, the correction value selecting means constituted by the image processing processor 303 selects the correction value in accordance with the distance up to the object from the correction value storing means constituted by the register 302.

The converting means constituted by the convolution device 301 converts the image signal based on the conversion coefficient obtained from the second conversion coefficient storing means constituted by the register 302 and the correction value selected by the correction value selecting means constituted by the image processing processor 303.

Figure 23:
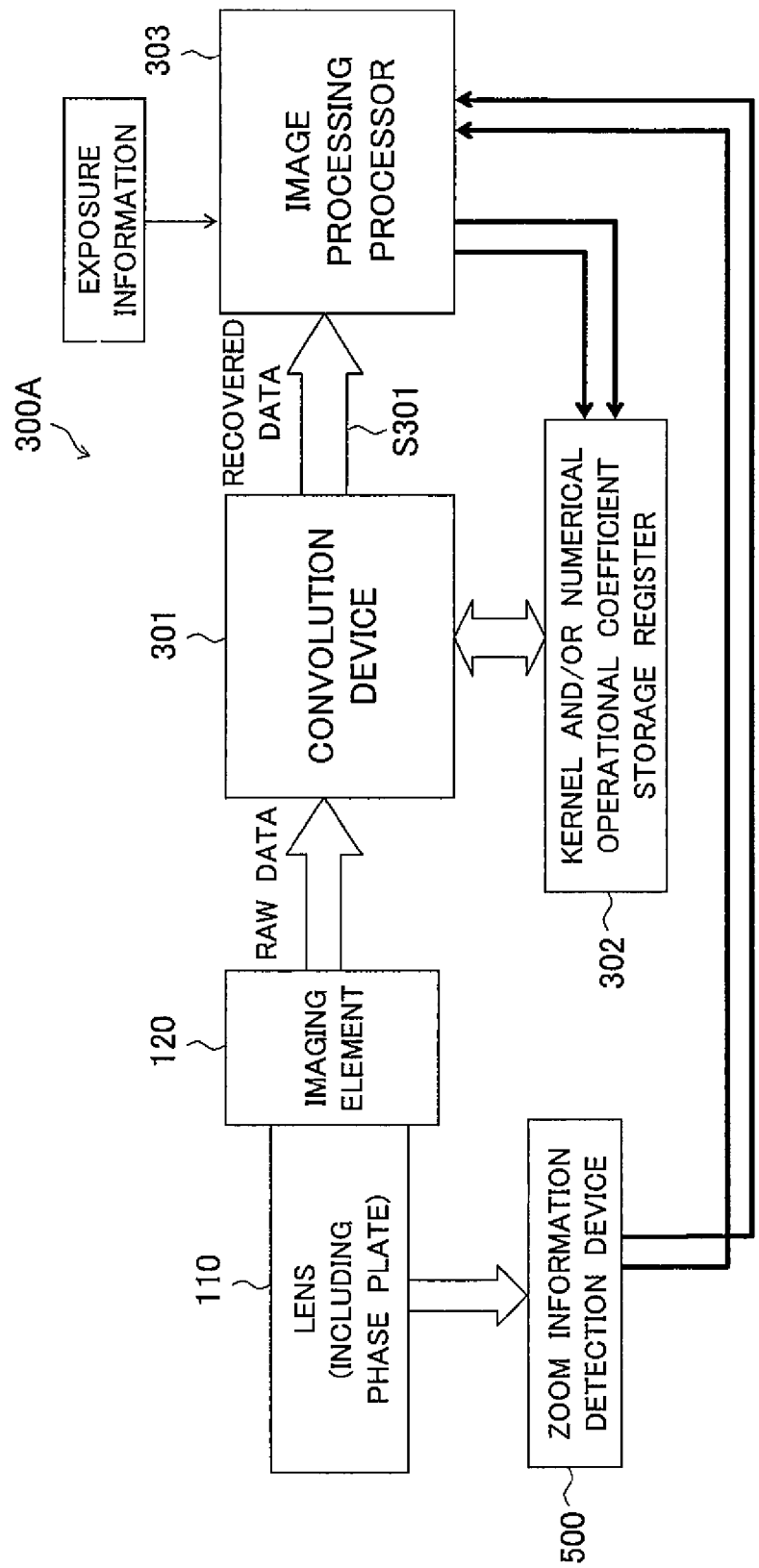
FIG. 23 is a diagram showing an example of the configuration of an image processing device combining zoom information and exposure information.

FIG. 23 is a diagram showing an example of the configuration of an image processing device combining zoom information and exposure information.

FIG. 23 shows an example of the configuration of an image processing device 300A generating a dispersion-free image signal from a dispersed image signal of an object from the imaging element 120.

The image processing device 300A, in the same way as FIG. 22, as shown in FIG. 23, has a convolution device 301, kernel and/or numerical operational coefficient storage register 302, and image processing processor 303.

In this image processing device 300A, the image processing processor 303 obtains information concerning the zoom position or zoom amount read out from the zoom information detection device 500 and the exposure information. It stores the kernel size and its operational coefficient used for suitable operation for the exposure information and zoom position in the kernel and/or numerical operational coefficient storage register 302 and performs suitable operation to restore the image at the convolution device 301 performing operation using those values.

As explained above, when applying a phase plate as an optical wavefront modulation optical element to an imaging device provided in a zoom optical system, the generated spot image differs according to the zoom position of the zoom optical system. For this reason, when performing the convolution operation of a focal point deviated image (spot image) obtained by the phase plate in a later DSP etc., in order to obtain the suitable focused image, convolution operation differing in accordance with the zoom position becomes necessary.

Therefore, the present embodiment is configured provided with the zoom information detection device 500, performing a suitable convolution operation in accordance with the zoom position, and obtaining a suitable focused image without regard as to the zoom position.

For suitable convolution operation in the image processing device 300A, it is possible to configure the system to commonly store one type of operational coefficient of convolution in the register 302.

Other than this configuration, it is also possible to employ the following configurations.

It is possible to employ a configuration storing in advance a correction coefficient in the register 302 in accordance with each zoom position, correcting the operational coefficient by using this correction coefficient, and performing a suitable convolution operation by the corrected operational coefficient, a configuration storing in advance the kernel size and the operational coefficient itself of the convolution in the register 302 in accordance with each zoom position and performing a convolution operation by these stored kernel size and operational coefficient, a configuration storing in advance the operational coefficient in accordance with the zoom position as a function in the register 302, finding the operational coefficient by this function according to the zoom position, and performing a convolution operation by the calculated operational coefficient, and so on.

When linking this with the configuration of FIG. 23, the following configuration can be employed.

The conversion coefficient storing means constituted by the register 302 stores in advance at least two conversion coefficients corresponding to aberration caused by the phase plate 113a in accordance with the zoom position or zoom amount of the zoom optical system 110. The image processing processor 303 functions as a coefficient selecting means for selecting the conversion coefficient in accordance with the zoom position or zoom amount of the zoom optical system 110 from the register 302 based on the information generated by the zoom information generating means constituted by the zoom information detection device 500.

Then, the converting means constituted by the convolution device 301 converts the image signal according to the conversion coefficient selected at the coefficient selecting means constituted by the image processing processor 303.

Alternatively, as explained before, the conversion coefficient processing means constituted by the image processing processor 303 processes the conversion coefficient based on the information generated by the zoom information generating means constituted by the zoom information detection device 500 and stores the result in the register 302.

Then, the converting means constituted by the convolution device 301 converts the image signal according to the conversion coefficient obtained in the conversion coefficient processing means constituted by the image processing processor 303 and stored in the register 302.

Alternatively, the correction value storing means constituted by the register 302 stores in advance at least one correction value in accordance with the zoom position or zoom amount of the zoom optical system 110. This correction value includes the kernel size of the object aberration image.

The register 302 functioning also as the second conversion coefficient storing means stores in advance a conversion coefficient corresponding to the aberration due to the phase plate 113a.

Then, based on the zoom information generated by the zoom information generating means constituted by the zoom information detection device 500, the correction value selecting means constituted by the image processing processor 303 selects the correction value in accordance with the zoom position or zoom amount from the correction value storing means constituted by the register 302.

The converting means constituted by the convolution device 301 converts the image signal based on the conversion coefficient obtained from the second conversion coefficient storing means constituted by the register 302 and the correction value selected by the correction value selecting means constituted by the image processing processor 303.

Figure 24:
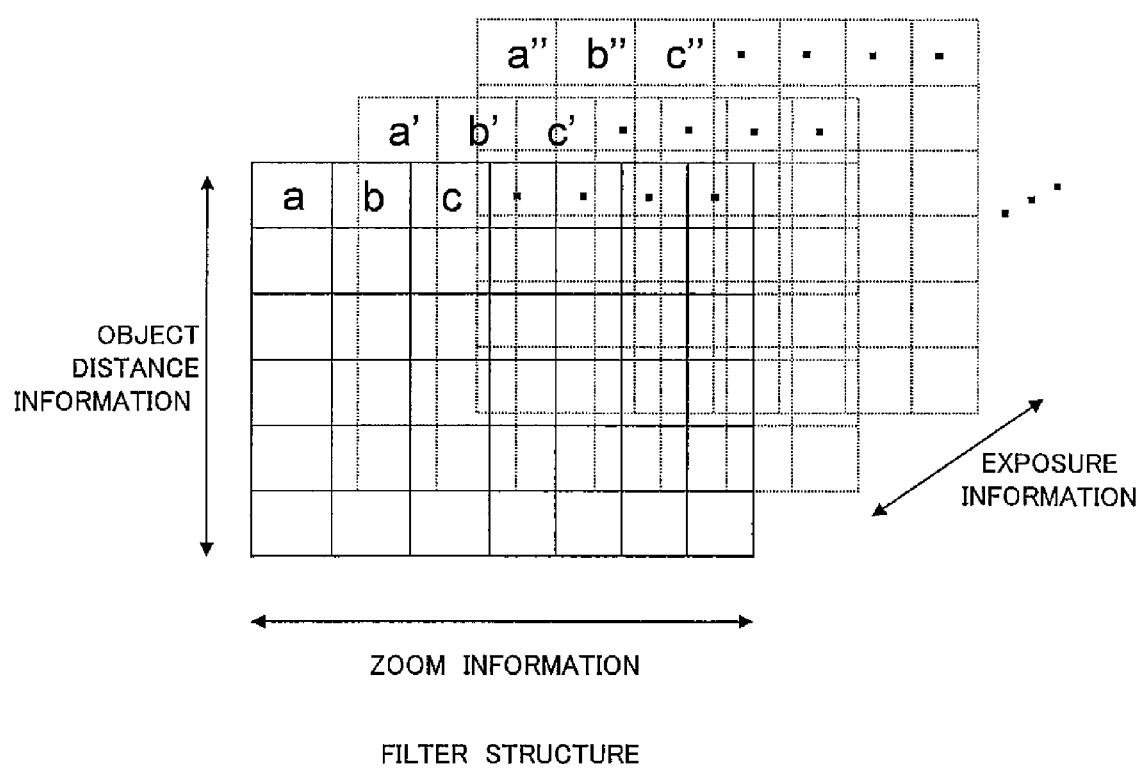
FIG. 24 is a diagram showing an example of the configuration of a filter in a case where the exposure information, object distance information, and zoom information are used.

FIG. 24 shows an example of the configuration of a filter in the case of using the exposure information, object distance information, and zoom information.

In this example, the object distance information and zoom information form two-dimensional information, and the exposure information forms depth-like information.

Figure 25:
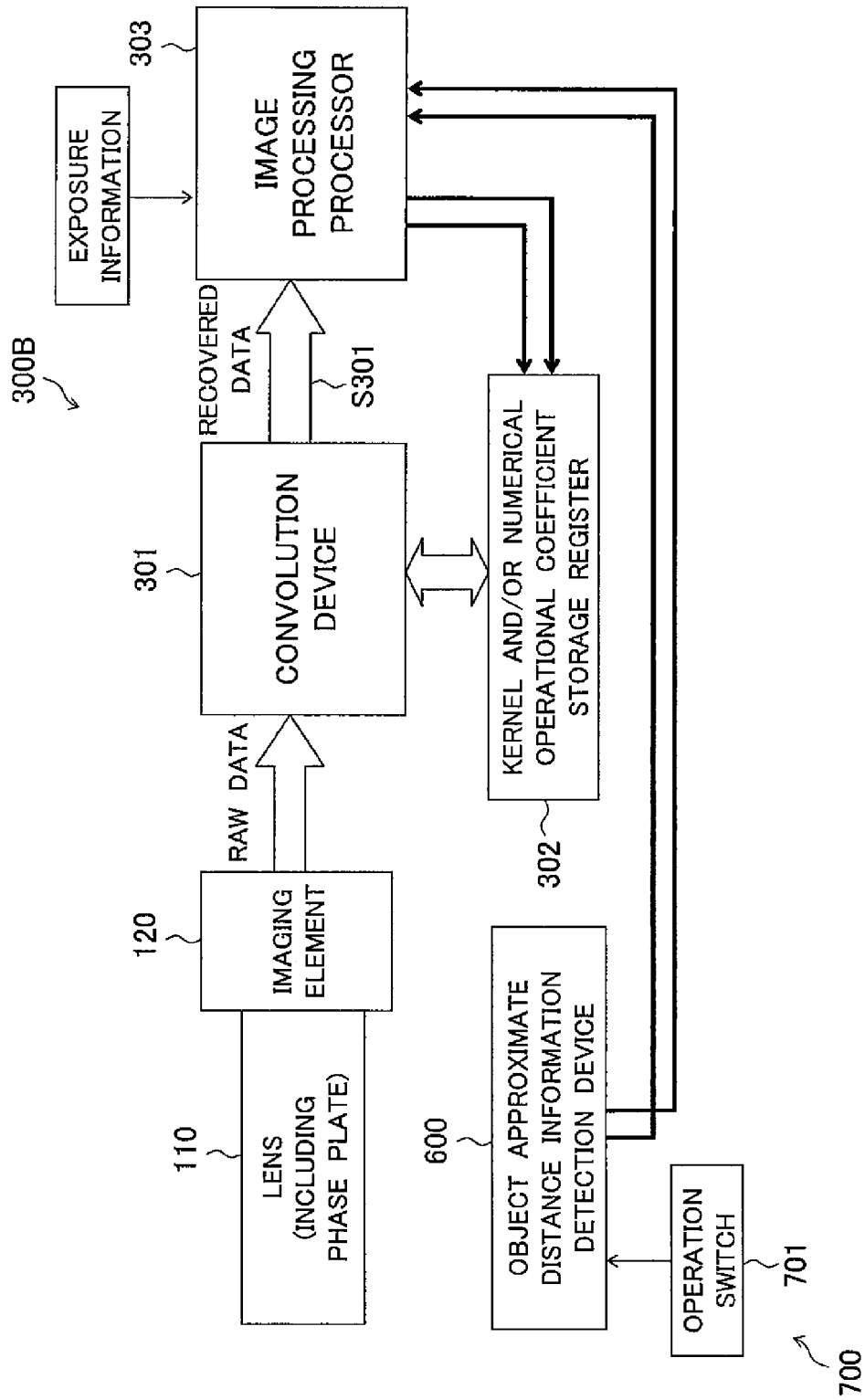
FIG. 25 is a diagram showing an example of the configuration of an image processing device combining image capturing mode information and exposure information.

FIG. 25 is a diagram showing an example of the configuration of an image processing device combining image capturing mode information and exposure information.

FIG. 25 shows an example of the configuration of an image processing device 300B generating a dispersion-free image signal from a dispersed image signal of an object from the imaging element 120.

The image processing device 300B, in the same way as FIG. 22 and FIG. 23, as shown in FIG. 25, has a convolution device 301, a storing means constituted by a kernel and/or numerical operational coefficient storage register 302, and an image processing processor 303.

In this image processing device 300B, the image processing processor 303 obtains information concerning an approximate distance of an object distance of an object read out from an object approximate distance information detection device 600 and the exposure information. It stores the kernel size and its operational coefficients used in suitable operation for the object distance position in the kernel and/or numerical operational coefficient storage register 302 and performs the suitable operation to restore the image at the convolution device 301 performing operation using those values.

In this case as well, as explained above, in the case of an imaging device having a phase plate (wavefront coding optical element) as an optical wavefront modulation element, if within a predetermined focal distance range, a suitable aberration-free image signal can be generated by image processing concerning that range, but if out of the predetermined focal length range, there is a limit to the correction of the image processing, therefore only an object out of the above range ends up becoming an image signal with aberration.

Further, on the other hand, by applying image processing not causing aberration within a predetermined narrow range, it also becomes possible to give blurriness to an image out of the predetermined narrow range.

The present example is configured so as to detect the distance up to the main object by the object approximate distance information detection device 600 including a distance detection sensor and perform processing for image correction different in accordance with the detected distance.

The above image processing is carried out by a convolution operation. In order to realize this, it is possible to employ a configuration commonly storing one type of operational coefficient of the convolution operation, storing in advance a correction coefficient in accordance with the object distance, correcting the operational coefficient by using this correction coefficient, and performing a suitable convolution operation by the corrected operational coefficient, a configuration storing in advance an operational coefficient in accordance with the object distance as a function, finding the operational coefficient by this function according to the focal length, and performing a convolution operation by the computed operational coefficient, a configuration storing in advance the kernel size and the operational coefficient itself of the convolution in accordance with the object distance and performing a convolution operation by these stored kernel size and operational coefficient, and so on.

In the present embodiment, as explained above, the image processing is changed in accordance with the mode setting of the DSC (portrait, infinitely distant (scenery), and macro).

When linking this with the configuration of FIG. 25, the following configuration can be employed.

As explained before, a conversion coefficient differing in accordance with each image capturing mode set by the image capturing mode setting unit 700 of the operating unit 190 through the conversion coefficient processing means constituted by the image processing processor 303 is stored in the conversion coefficient storing means constituted by the register 302.

The image processing processor 303 extracts the conversion coefficient from the conversion coefficient storing means constituted by the register 302 based on the information generated by the object distance information generating means constituted by the object approximate distance information detection device 600 in accordance with the image capturing mode set by the operation switch 701 of the image capturing mode setting unit 700. At this time, for example the image processing processor 303 functions as a conversion coefficient extracting means.

Further, the converting means constituted by the convolution device 301 performs the conversion processing in accordance with the image capturing mode of the image signal according to the conversion coefficient stored in the register 302.

Note that the optical systems of FIG. 10 and FIG. 11 are just examples. The present invention is not always used for the optical systems of FIG. 10 and FIG. 11. Further, for the spot shape as well, FIG. 12 and FIG. 13 are just examples. The spot shape of the present embodiment is not limited to those shown in FIG. 12 and FIG. 13.

Further, the kernel data storage ROM of FIG. 15 and FIG. 16 is not always used for the optical magnification, F number, size of each kernel, and its value. Further, the number of prepared kernel data is not limited to three either.

The storage amount becomes larger by employing three dimensions or further four dimensions as shown in FIG. 24, but it becomes possible to consider various conditions and select more suitable ones. Information may be exposure information, object distance information, zoom information, capturing mode information, and so on.

Note that, as explained above, in the case of an imaging device having a phase plate (wavefront coding optical element) as the optical wavefront modulation element, if within the predetermined focal distance range, a suitable aberration-free image signal can be generated by the image processing concerning that range, but if out of the predetermined focal length range, there is a limit to the correction of the image processing, therefore only an object out of the above range ends up becoming an image signal with aberration.

Further, on the other hand, by applying image processing not causing aberration within a predetermined narrow range, it also becomes possible to give blurriness to an image out of the predetermined narrow range.

In the present embodiment, DEOS is employed, so it is possible to obtain a high definition image quality. In addition, the optical system can be simplified, and the costs can be reduced.

Below, these characteristic features will be explained.

Figure 26A:
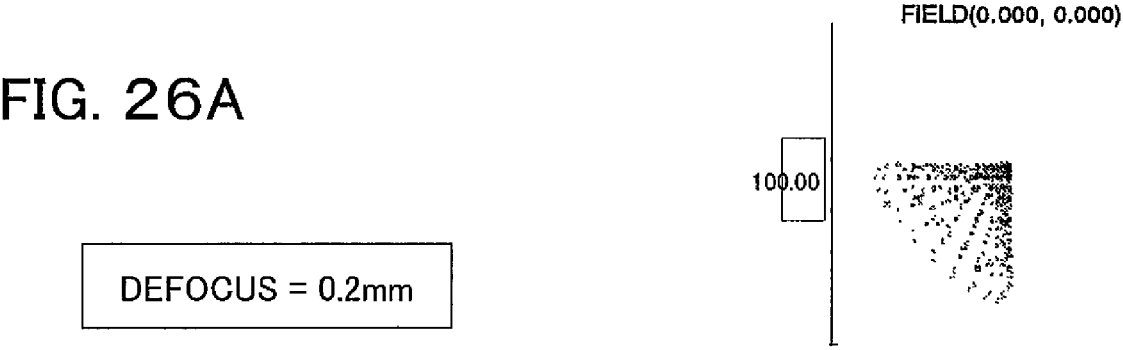
Figure 26B:
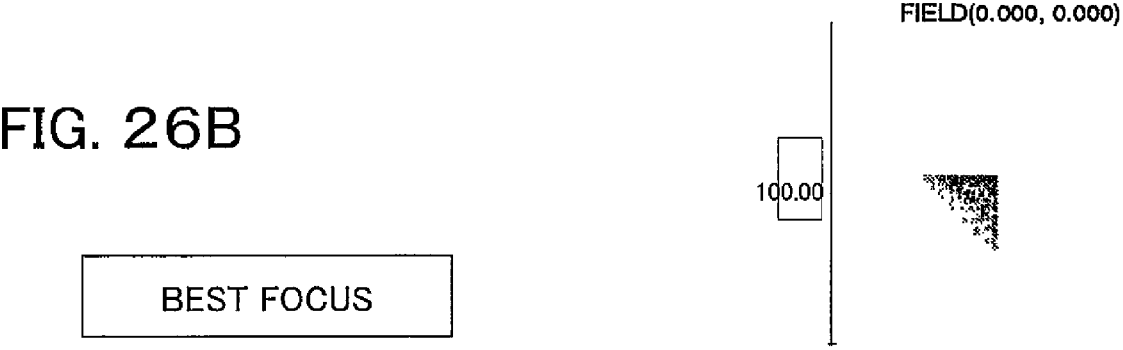
Figure 26C:
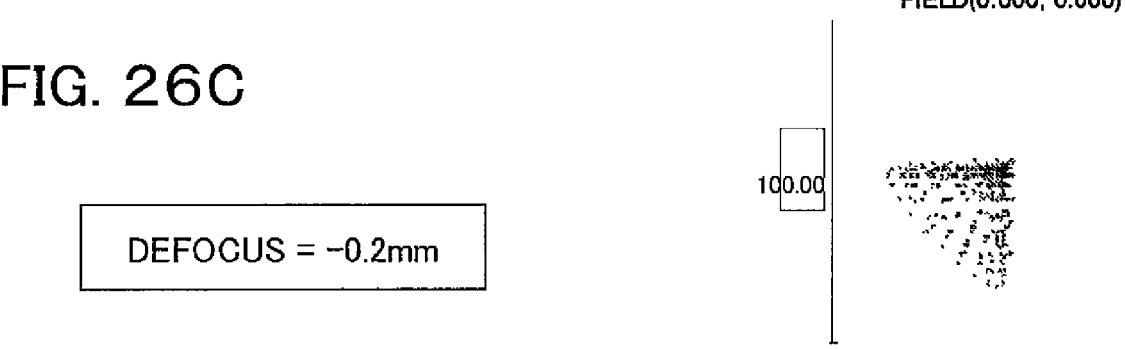

FIG. 26A to FIG. 26C show spot images on the light receiving surface of the imaging element 120.

FIG. 26A is a diagram showing a spot image in the case where the focal point is deviated by 0.2 mm (defocus=0.2 mm), FIG. 26B is a diagram showing a spot image in the case of focus (best focus), and FIG. 26C is a diagram showing a spot image in the case where the focal point is deviated by −0.2 mm (defocus=−0.2 mm).

As seen also from FIG. 26A to FIG. 26C, in the imaging device 100 according to the present embodiment, light rays having a deep depth (playing a central role in the image formation) and flare (blurred portion) are formed by the wavefront forming optical element group 113 including the phase plate 113a.

In this way, the first order image FIM formed in the imaging device 100 of the present embodiment is given light ray conditions resulting in deep depth.

Figure 27A:
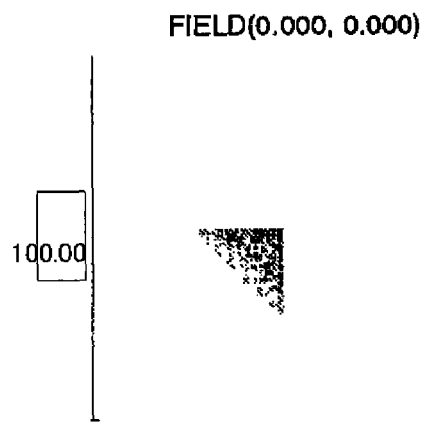
Figure 27B:
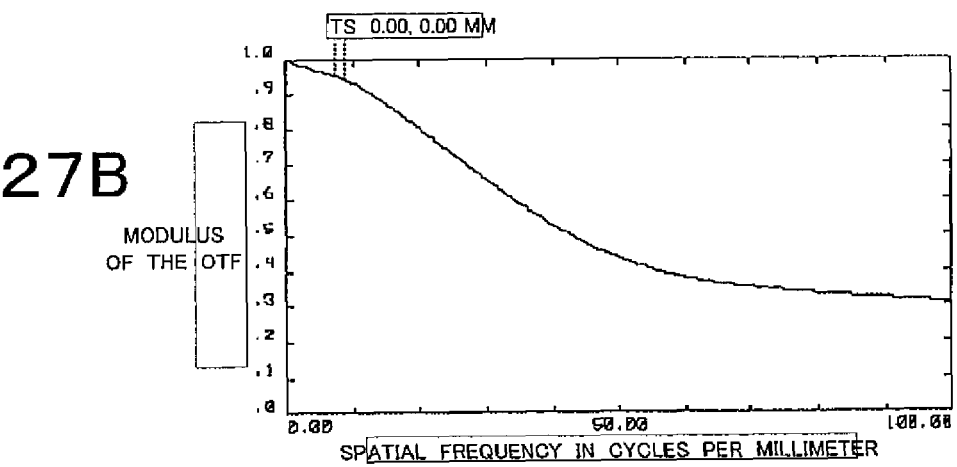

FIG. 27A and FIG. 27B are diagrams for explaining a modulation transfer function (MTF) of the first order image formed by the imaging lens device according to the present embodiment, in which FIG. 27A is a diagram showing a spot image on the light receiving surface of the imaging element of the imaging lens device, and FIG. 27B shows the MTF characteristic with respect to the spatial frequency.

In the present embodiment, the high definition final image is left to the correction processing of the latter stage image processing device 150 configured by, for example, a digital signal processor. Therefore, as shown in FIG. 27A and FIG. 27B, the MTF of the first order image essentially becomes a very low value.

The image processing device 150, as explained above, receives the first order image FIM from the imaging element 120, applies predetermined correction processing etc. for boosting the MTF at the spatial frequency of the first order image, and forms a high definition final image FNLIM.

Figure 28:
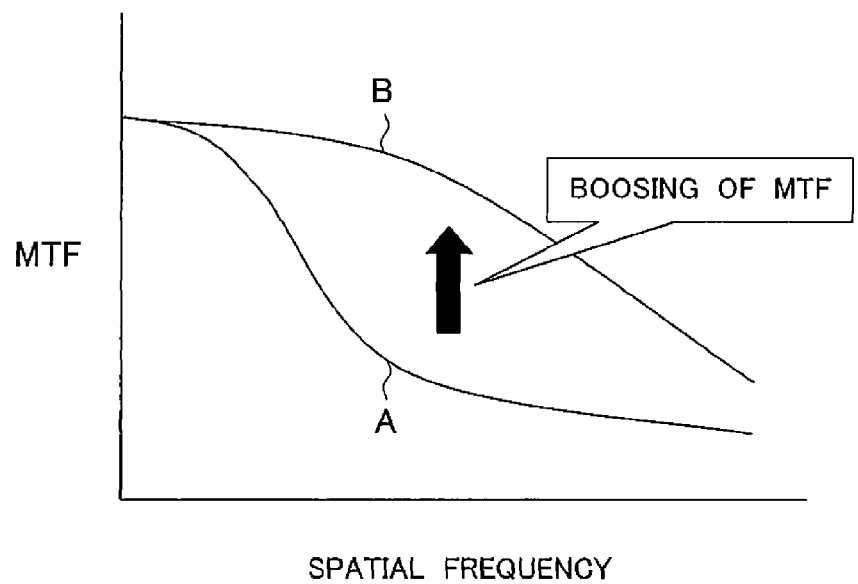
FIG. 28 is a diagram for explaining an MTF correction processing in the image processing apparatus according to the present embodiment.

The MTF correction processing of the image processing device 150 performs correction so that, for example as indicated by a curve A of FIG. 28, the MTF of the first order image which essentially becomes a low value approaches (reaches) the characteristic indicated by a curve B in FIG. 28 by post-processing such as edge enhancement and chroma enhancement using the spatial frequency as a parameter.

The characteristic indicated by the curve B in FIG. 28 is the characteristic obtained in the case where the wavefront forming optical element is not used and the wavefront is not deformed as in for example the present embodiment.

Note that all corrections in the present embodiment are according to the parameter of the spatial frequency.

In the present embodiment, as shown in FIG. 28, in order to achieve the MTF characteristic curve B desired to be finally realized with respect to the MTF characteristic curve A for the optically obtained spatial frequency, the strength of the edge enhancement etc. is adjusted for each spatial frequency to correct the original image (first order image).

Figure 29:
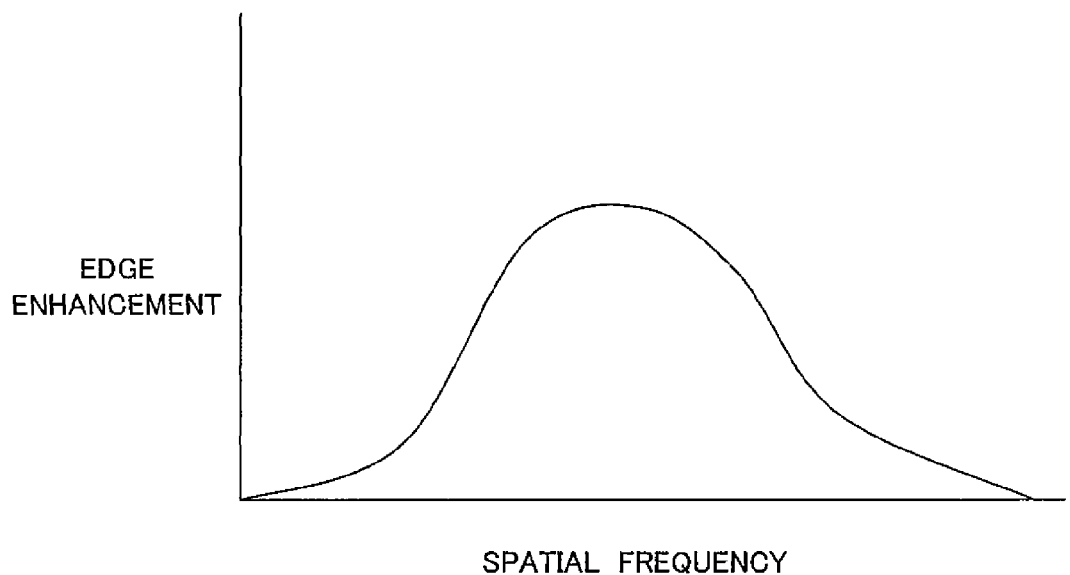
FIG. 29 is a diagram for concretely explaining the MTF correction processing in the image processing apparatus according to the present embodiment.

For example, in the case of the MTF characteristic of FIG. 28, the curve of the edge enhancement with respect to the spatial frequency becomes as shown in FIG. 29.

Namely, by performing the correction by weakening the edge enhancement on the low frequency side and high frequency side within a predetermined bandwidth of the spatial frequency and strengthening the edge enhancement in an intermediate frequency zone, the desired MTF characteristic curve B is virtually realized.

In this way, the imaging device 100 according to the present embodiment is an image forming system basically configured by the optical system 110 and imaging element 120 for forming the first order image and the image processing device 150 for forming the first order image to a high definition final image. The optical system is newly provided with a wavefront forming optical element or is provided with a glass, plastic, or other optical element with a surface shaped for wavefront forming use so as to deform (modulate) the wavefront of the image formed. Such a wavefront is focused onto the imaging surface (light receiving surface) of the imaging element 120 formed by a CCD or CMOS sensor. The focused first order image is passed through the image processing device 150 to obtain the high definition image.

In the present embodiment, the first order image from the imaging element 120 is given light ray conditions with very deep depth. For this reason, the MTF of the first order image essentially becomes a low value, and the MTF thereof is corrected by the image processing device 150.

Here, the process of image formation in the imaging device 100 of the present embodiment will be considered in terms of wave optics.

A spherical wave scattered from one point of an object point becomes a converged wave after passing through the imaging optical system. At that time, when the imaging optical system is not an ideal optical system, aberration occurs. The wavefront becomes not spherical, but a complex shape. Geometric optics and wave optics are bridged by wavefront optics. This is convenient in the case where a wavefront phenomenon is handled.

When handling a wave optical MTF on an imaging plane, the wavefront information at an exit pupil position of the imaging optical system becomes important.

The MTF is calculated by a Fourier transform of the wave optical intensity distribution at the imaging point. The wave optical intensity distribution is obtained by squaring the wave optical amplitude distribution. That wave optical amplitude distribution is found from a Fourier transform of a pupil function at the exit pupil.

Further, the pupil function is just the wavefront information (wavefront aberration) at the exit pupil position, therefore if the wavefront aberration can be strictly calculated as a numerical value through the optical system 110, the MTF can be calculated.

Accordingly, if modifying the wavefront information at the exit pupil position by a predetermined technique, the MTF value on the imaging plane can be freely changed.

In the present embodiment as well, the shape of the wavefront is mainly changed by a wavefront forming optical element. It is truly the phase (length of light path along the light rays) that is adjusted to form the desired wavefront.

Then, when forming the target wavefront, the light rays emitted from the exit pupil are formed by a dense light ray portion and a sparse light ray portion as seen from the geometric optical spot images shown in FIG. 26A to FIG. 26C.

The MTF of this state of light rays exhibits a low value at a position where the spatial frequency is low and somehow maintains the resolution up to the position where the spatial frequency is high.

Namely, if this low MTF value (or, geometric optically, the state of the spot image), the phenomenon of aliasing will not be caused.

That is, a low pass filter is not necessary.

Further, the flare-like image causing a drop in the MTF value may be eliminated by the image processing device 150 configured by the later stage DSP etc. Due to this, the MTF value is remarkably improved.

Next, responses of the MTF of the present embodiment and a conventional optical system will be considered.

Figure 30:
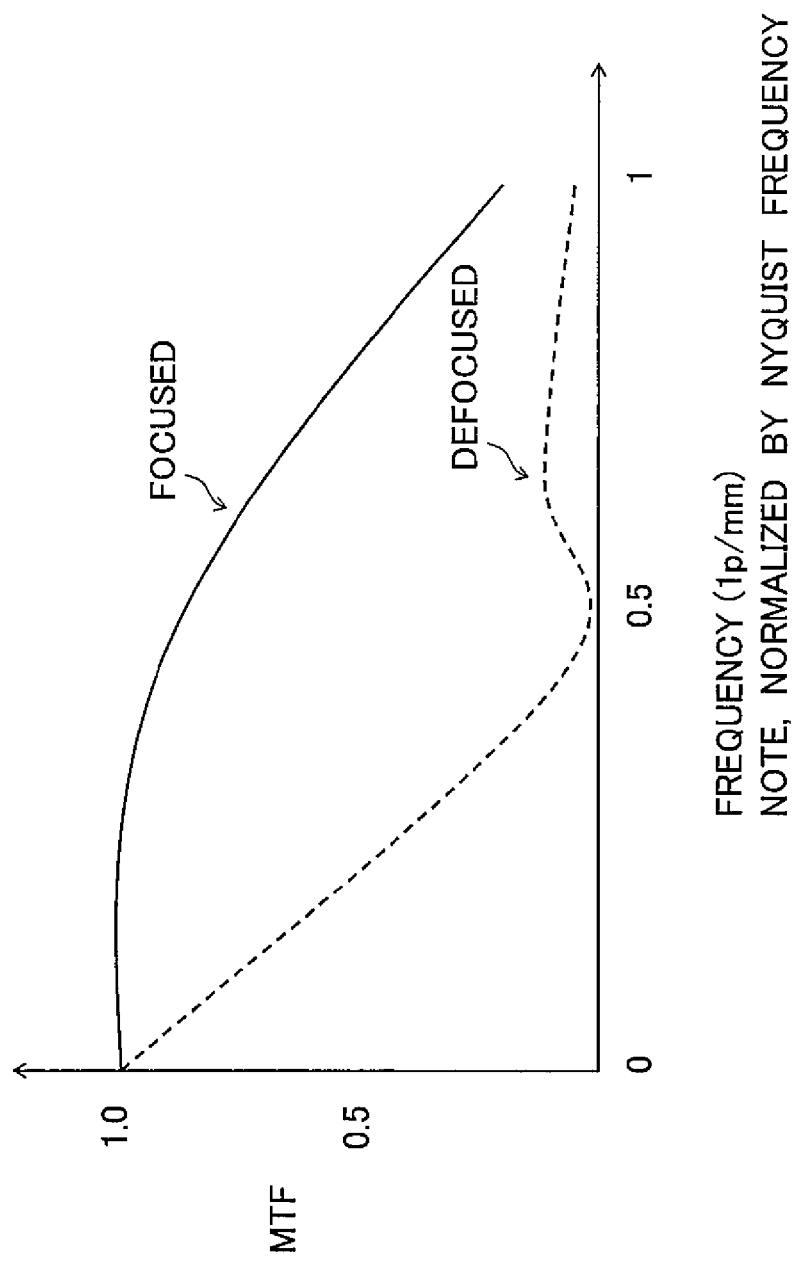
FIG. 30 is a diagram showing responses of the MTF at a time when the object is located at the focus position and a time when the object is off from the focus position in the case of the general optical system.

FIG. 30 is a diagram showing the responses of the MTF at a time when the object is located at the focus position and a time when it is out of the focus position in the case of the general optical system.

Figure 31:
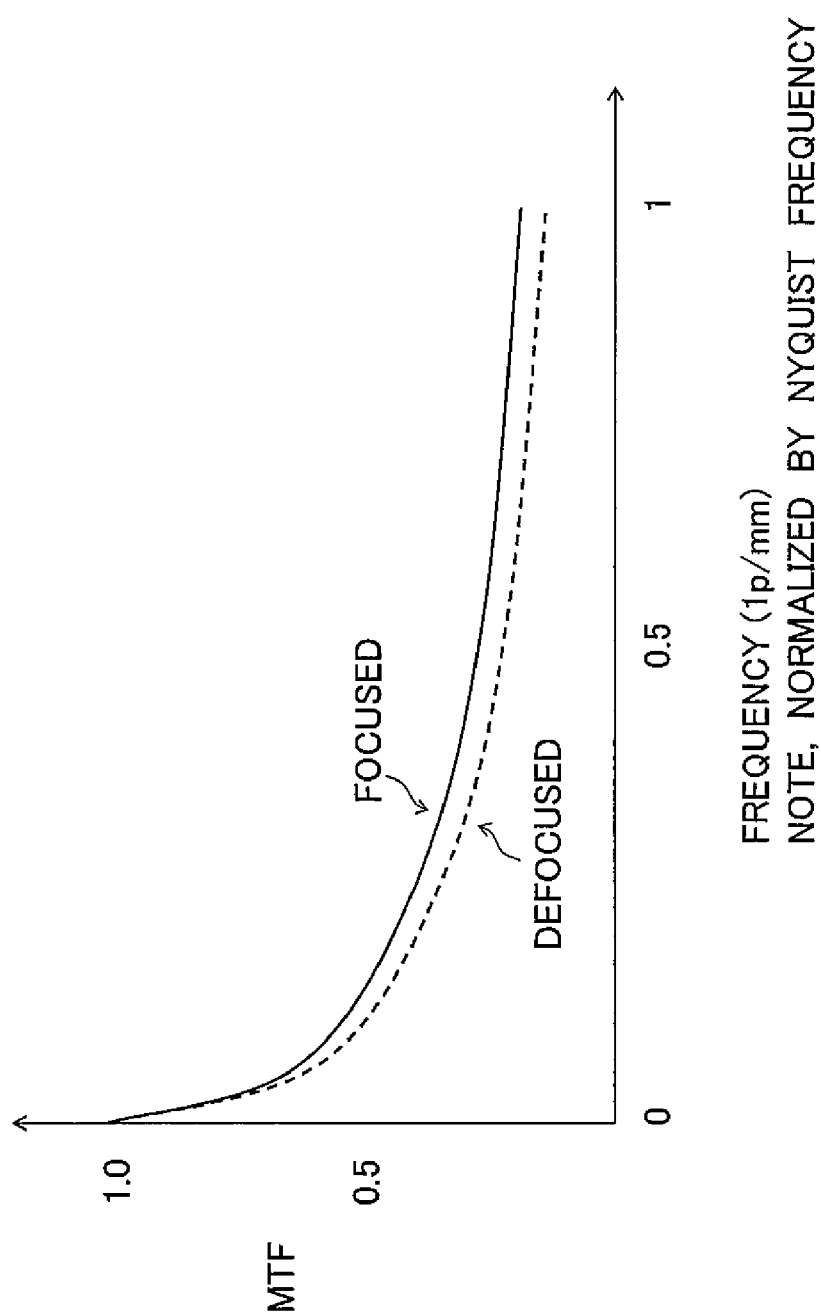
FIG. 31 is a diagram showing responses of the MTF at the time when the object is located at the focus position and the time when the object is off from the focus position in the case of the optical system of the present embodiment having an optical wavefront modulation element.

FIG. 31 is a diagram showing responses of the MTF at the time when the object is located at the focus position and the time when it is out of the focus position in the case of the optical system of the present embodiment having an optical wavefront modulation element.

Figure 32:
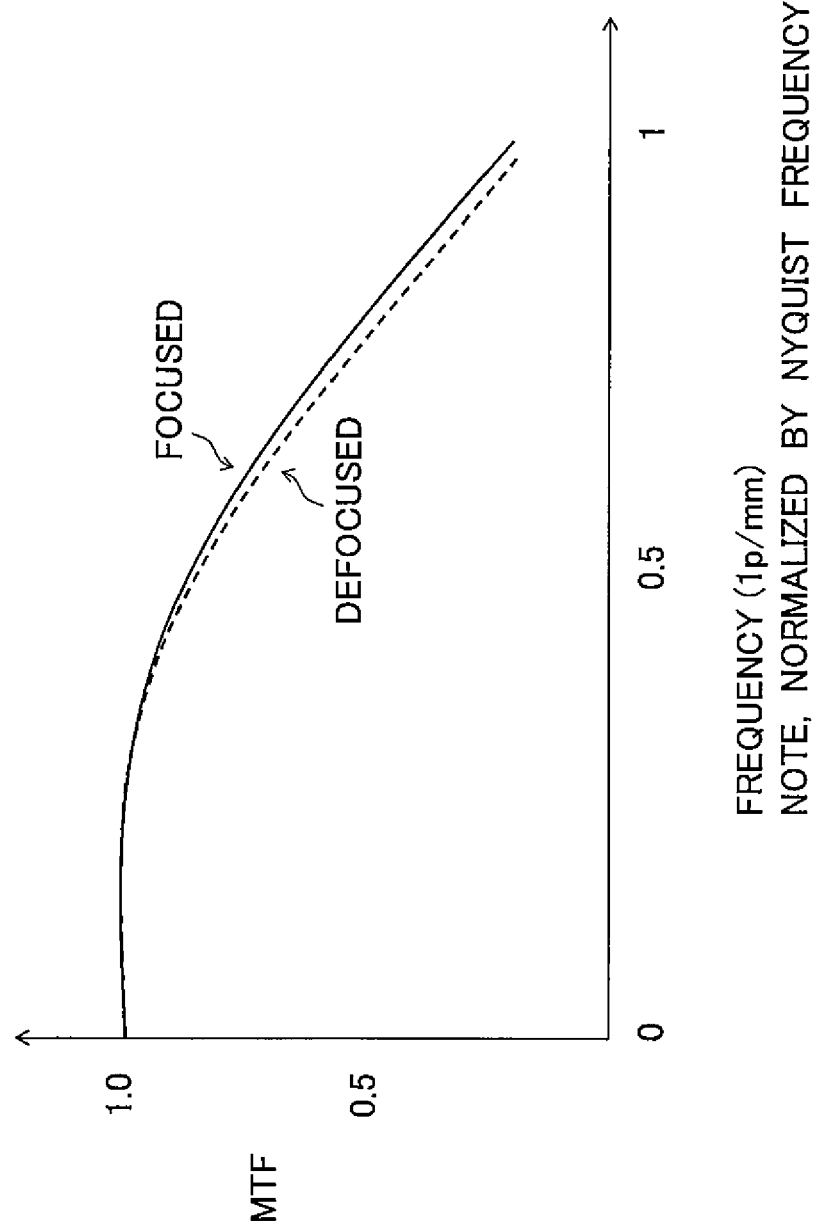
FIG. 32 is a diagram showing the response of the MTF after data restoration of the imaging device according to the present embodiment.

Further, FIG. 32 is a diagram showing the response of the MTF after the data restoration of the imaging device according to the present embodiment.

As seen from the figures as well, in the case of the optical system having an optical wavefront modulation element, even in the case where the object is out of the focus position, the change of the response of the MTF becomes smaller than that in the optical system not inserting an optical wavefront modulation element.

The image formed by this optical system is subjected to the processing by the convolution filter, whereby the response of the MTF is improved.

As explained above, according to the present embodiment, provision is made of the optical system 110 designed so that the image is not focused even at the focus position, but the PSF (Point Spread Function) becomes almost constant before and after that, the imaging element 120 capturing the image of the optical system, the image processing device 150 performing blurring restoration processing, the camera signal processing unit 160 obtaining the final image, the image monitoring device 180 displaying the image output from the camera signal processing unit 160, displaying the through image in order to determine the image angle and capture timing, and displaying the captured image, the operating unit 190 capable of generating the trigger signal for capturing the image, and the control device 200 performing control so as to directly input the image signal of the imaging element to the camera signal processing unit 160 without passing it through the image processing device 150 performing the blurring restoration processing during the display of the through image, perform the blurring restoration processing in accordance with the PSF at the image processing device 150 with respect to the image captured by receiving the trigger signal, and output the same to the camera signal processing unit 160, therefore the following effects can be obtained.

During the display of a through image for determining the composition, a high frame rate is maintained while a certain degree of time can be taken for the blurring restoration processing at the time of capturing the image, therefore expensive hardware is not necessary. Further, even if an operation for enlarging the captured image and moving the enlarged portion is carried out, the full image of the captured image is subjected to the blurring restoration, therefore detailed portions can be checked precisely and no unnaturalness occurs in the operation and look.

Further, the extent of blurring of the PSF explained before was set to not more than 2 times of the pixel pitch of the image monitoring device 180. Therefore, even a through image which is blurred as it is has a fineness of the same level as the monitor, therefore no worrisome blurring occurs on the monitor.

Further, the image was output to the monitor after performing the camera processing after the end of the blurring restoration processing in accordance with the PSF in the image processing device 150 performing the blurring restoration processing for the image captured by receiving the trigger signal. Therefore, even if a certain degree of time is taken for the blurring restoration processing, the user need only wait for the image to automatically appear. The complaint that the image does not appear even the user performs some operation can be eliminated.

Further, an image having a small image size level required for the monitor is output from the imaging element 120 during the display of a through image, therefore a high frame rate can be realized during the display of the through image and an extra margin is created in the resources, therefore the power consumption can be reduced.

Further, according to the present embodiment, the devices includes the optical system 110 and imaging element 120 forming the first order image and the image processing device 150 forming the first order image to a high definition final image. The image processing device 150 performs filtering on the optical transfer function (OTF) in accordance with the exposure information from the exposure control device 200. Therefore, there are the advantages that the optical system can be simplified, the costs can be reduced, and in addition a restored image having little influence of noise can be obtained.

Further, by making the kernel size used at the time of the convolution operation and the coefficient used in the processing of the numerical value thereof variable and linking the kernel size which is learned by the input of the operating unit 190 etc. and becomes suitable with the above coefficient, there are the advantages that the lens can be designed without worrying about the magnification and defocus range, and image restoration by high precision convolution becomes possible.

Further, there is the advantage that a so-called natural image where the image to be captured is in focus, but the background is blurred can be obtained without requiring optical lenses having a high difficulty, expensive cost, and large size and without driving the lenses.

Furthermore, the imaging device 100 according to the present embodiment can be used for the DEOS of a zoom lens designed considering small size, light weight, and cost in a digital camera, camcorder, or other consumer electronic device.

Further, in the present embodiment, since the device has an imaging lens system having a wavefront forming optical element for deforming the wavefront of the image formed on a light receiving surface of the imaging element 120 by the imaging lens 112 and has the image processing device 150 for receiving the first order image FIM by the imaging element 120 and applying predetermined correction processing etc. to boost the MTF at the spatial frequency of the first order image and form the high definition final image FNLIM, there is the advantage that the acquisition of a high definition image quality becomes possible.

Further, the configuration of the optical system 110 can be simplified, production becomes easy, and costs can be reduced.

When using a CCD or CMOS sensor as the imaging element, there is a resolution limit determined from the pixel pitch. When the resolution of the optical system is over that limit resolution power, the phenomenon of aliasing is generated and exerts an adverse influence upon the final image. This is a known fact.

For the improvement of the image quality, desirably the contrast is raised as much as possible, but this requires a high performance lens system.

However, as explained above, when using a CCD or CMOS sensor as the imaging element, aliasing occurs.

At present, in order to avoid the occurrence of aliasing, the imaging lens system jointly uses a low pass filter made of a uniaxial crystal system together to thereby avoid the phenomenon of aliasing.

The joint usage of the low pass filter in this way is correct in terms of principle, but a low pass filter per se is made of crystal, therefore is expensive and hard to manage. Further, there is the disadvantage that the optical system becomes more complicated due to the use in the optical system.

As described above, a higher definition image quality is demanded as a trend of the times. In order to form a high definition image, the optical system in a conventional imaging lens device must be made more complicated. If it is complicated, production becomes difficult. Also, the utilization of the expensive low pass filters leads to an increase in the cost.

However, according to the present embodiment, the occurrence of the phenomenon of aliasing can be avoided without using a low pass filter, and a high definition image quality can be obtained.

Note that, in the present embodiment, the example of arranging the wavefront forming optical element of the optical system on the object side from the stop was shown, but functional effects the same as those described above can be obtained even by arranging the wavefront forming optical element at a position the same as the position of the stop or on the focus lens side from the stop.

Note that, the optical systems of FIG. 10 and FIG. 11 are just examples. The present invention is not always used for the optical systems of FIG. 10 and FIG. 11. Further, for the spot shape as well, FIG. 12 and FIG. 13 are just examples. The spot shape of the present embodiment is not limited to those shown in FIG. 12 and FIG. 13.

Further, the kernel data storage ROM of FIG. 15 and FIG. 16 is not always used for the optical magnification, F number, size of each kernel, and its value. Further, the number of prepared kernel data is not limited to three either.

Figure 33:
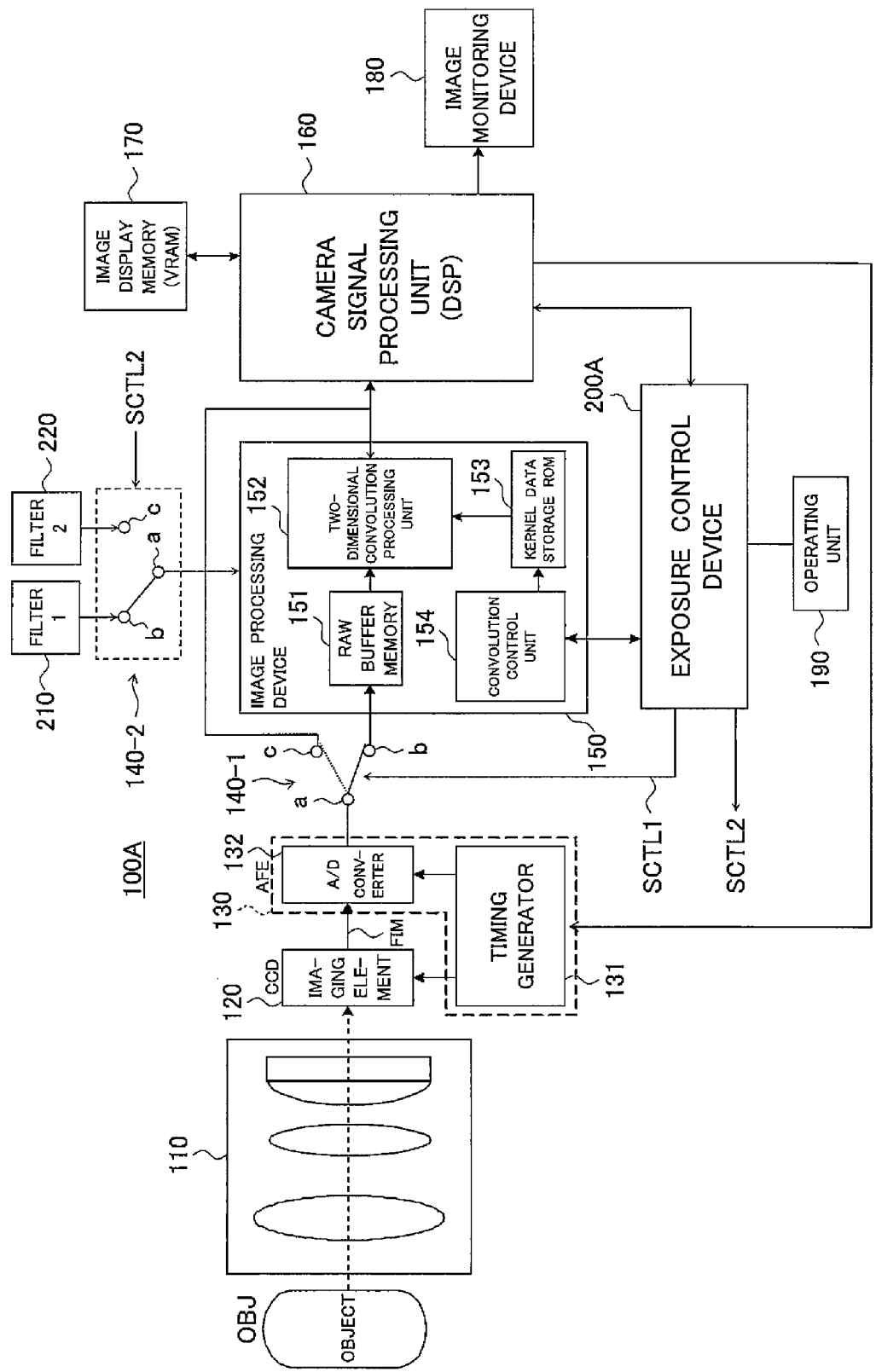
FIG. 33 is a block diagram showing the configuration of an imaging device according to a second embodiment of the present invention.

FIG. 33 is a block diagram showing the configuration of an imaging device according to a second embodiment of the present invention.

The difference of an imaging device 100A according to the second embodiment from the imaging device 100 according to the first embodiment explained above resides in that, in addition to the first switching unit 140-1 corresponding to the switching unit 140 of FIG. 3, provision is made of a second switching unit 140-2, a first filter 210 used for the image restoration processing of the image processing device 150 at the time of the still image image capturing mode, and a second filter 220 used for the image restoration processing of the image processing device 150 at the time of capturing a moving picture and/or the time of the display of the through image, and the configuration is made so that filters used for the image restoration processing at the time of the capturing a still image, the time of the capturing a moving picture, and the time of the capturing a through image are selectively switched.

The first switching unit 140-1 selectively inputs the captured image signal of the imaging element 120 via the AFE 130 to the image processing device 150 or camera signal processing unit 160 in accordance with a switch control signal SCTL1 from the exposure control device 200.

In the switching unit 140-1, the fixed contact a is connected to the output line of the A/D converter 132 of the AFE 130, the working contact b is connected to the input line of the image processing device 150, and the working contact c is connected to the signal input line of the camera signal processing unit 160.

The switching unit 140-1 is controlled so that the fixed contact a is connected to the working contact c during display of a through image when displaying for example the through image in the monitoring device 180. On the other hand, when capturing the image and storing the image in the memory 170, this is controlled so that the fixed contact a is connected to the working contact b.

The second switching unit 140-2 is controlled so that the first filter 210 or second filter 220 is connected to the image processing device 150 in accordance with a switch control signal SCTL2 from the exposure control device 200, the filter is selectively used in accordance with the image capturing mode, and the two-dimensional convolution processing of the image processing device 150 explained later is performed.

In the second switching unit 140-2, the fixed contact a is connected to the input/output line of the image processing device 150, the working contact b is connected to the first filter 210, and the working contact c is connected to the second filter 220.

The second switching unit 140-2 is controlled so that the fixed contact a is connected to the working contact b so as to use the first filter 210 for the image restoration processing of the image processing device 150. On the other hand, it is controlled so that the fixed contact a is connected to the working contact c so as to use the second filter 220 for the image restoration processing of the image processing device 150 at the time of the capturing a moving picture and/or the time of the display of a through image.

In the second embodiment, the second filter 220 has an edge enhancement and bandwidth enhancement function of the image. As a filter having an edge enhancement and bandwidth enhancement function, it is possible to employ for example a low pass filter, high pass filter, convolution filter, etc. A convolution filter is formed as an image restoration filter using sampled PSF (Point Spread Function).

For example, in the image processing device 150, during the display of a through image, the image processing device 150 does not perform a convolution operation using the first filter 210, but performs so-called simple restoration processing using the second filter 220.

The present embodiment is configured so that, by performing the simple restoration processing using the PSF sampled in accordance with the resolution of the image monitoring means constituted by the image monitoring device 180, even for the through image, an image quality in accordance with the image monitoring device 180 is obtained.

Further, in the present embodiment, the size of the second filter 220 is set to a size smaller than the size of the first filter 210.

Further, in the exposure control device 200A in the present embodiment, for example a configuration where both of the first switching unit 140-1 and second switching unit 140-2 perform the switch control operation according to the operation content of the operating unit 190 functioning as the setting means and trigger signal generating means, a configuration where the first switching unit 140-1 does not perform the switch control, but connects the fixed contact a and the working contact b in a fixed manner, a configuration where only the first filter is used or only the second filter is used or both filters are not used in the image restoration processing in the image processing device 150 without operating the second switching unit 140-2, a configuration setting presence/absence of execution of the image restoration processing using the filter at the time of capturing a moving picture and the time of the display of a through image, and other various configurations and functions can be selected from.

The exposure control device 200A performs the exposure control and, at the same time, waits for the operation inputs of the operating unit 190 etc., determines the operation of the overall system in accordance with these inputs, controls the AFE 130, image processing device 150, DSP 160 etc., and conducts the mediation control of the overall system.

The exposure control device 200A, for example during the display of a through image, connects the fixed contact a and the working contact c of the switching unit 140-1 by the switch control signal SCTL1 and directly inputs the captured image signal of the imaging element 120 not subjected to the restoration processing to the camera signal processing unit 160.

On the other hand, the exposure control device 200A, when receiving the trigger signal by the operating unit 190, judges the mode to be capturing the image and storing the image in the memory 170, connects the fixed contact a and the working contact b of the switching unit 140-1 by the switch control signal SCTL1, and inputs the image to the image processing device 150 so as to apply the restoration processing to the image.

Namely, the exposure control device 200A makes the image processing device 150 perform the restoration processing on the image captured by receiving the trigger signal, then makes the camera signal processing unit 160 apply predetermined image processing, then makes the image monitoring device 180 display the image.

Further, the exposure control device 200A, for example through the camera signal processing unit 160, issues an instruction to the timing generator 131 so as to make the imaging element 120 output an image able to be sufficient resolved as necessary by the resolution of the image monitoring device 180 during the display of a through image in the image monitoring device 180.

Further, the exposure control device 200A of the second embodiment, in accordance with the operation of the operating unit 190, controls the second switching unit 140-2 by the switch control signal SCTL2 so that the fixed contact a is connected to the working contact b so as to use the first filter 210 for the image restoration processing of the image processing device 150 at the time of the still image capturing mode and so that the fixed contact a is connected to the working contact c so as to use the second filter 220 for the image restoration processing of the image processing device 150 at the time of capturing a moving picture and/or time of displaying a through image.

Further, in the present embodiment, according to the operation content of the operating unit 190, the exposure control device 200A may perform control so as to input to the camera signal processing unit 160 an image signal for which the image restoration processing is not executed at the image processing device 150 during the display of a through image at the time of capturing a moving picture and execute the image restoration processing by the image processing device 150 when storing the image in the memory 170.

Alternatively, according to the operation content of the operating unit 190, the exposure control device 200A may perform control so as to input to the camera signal processing unit 160 an image signal for which the image restoration processing is not executed at the image processing device 150 and store the image signal for which the image restoration processing is not executed in the memory 170 at the time of capturing a moving picture and execute the image restoration processing by the image processing device 150 when reproducing this image from the memory 170.

Figure 34:
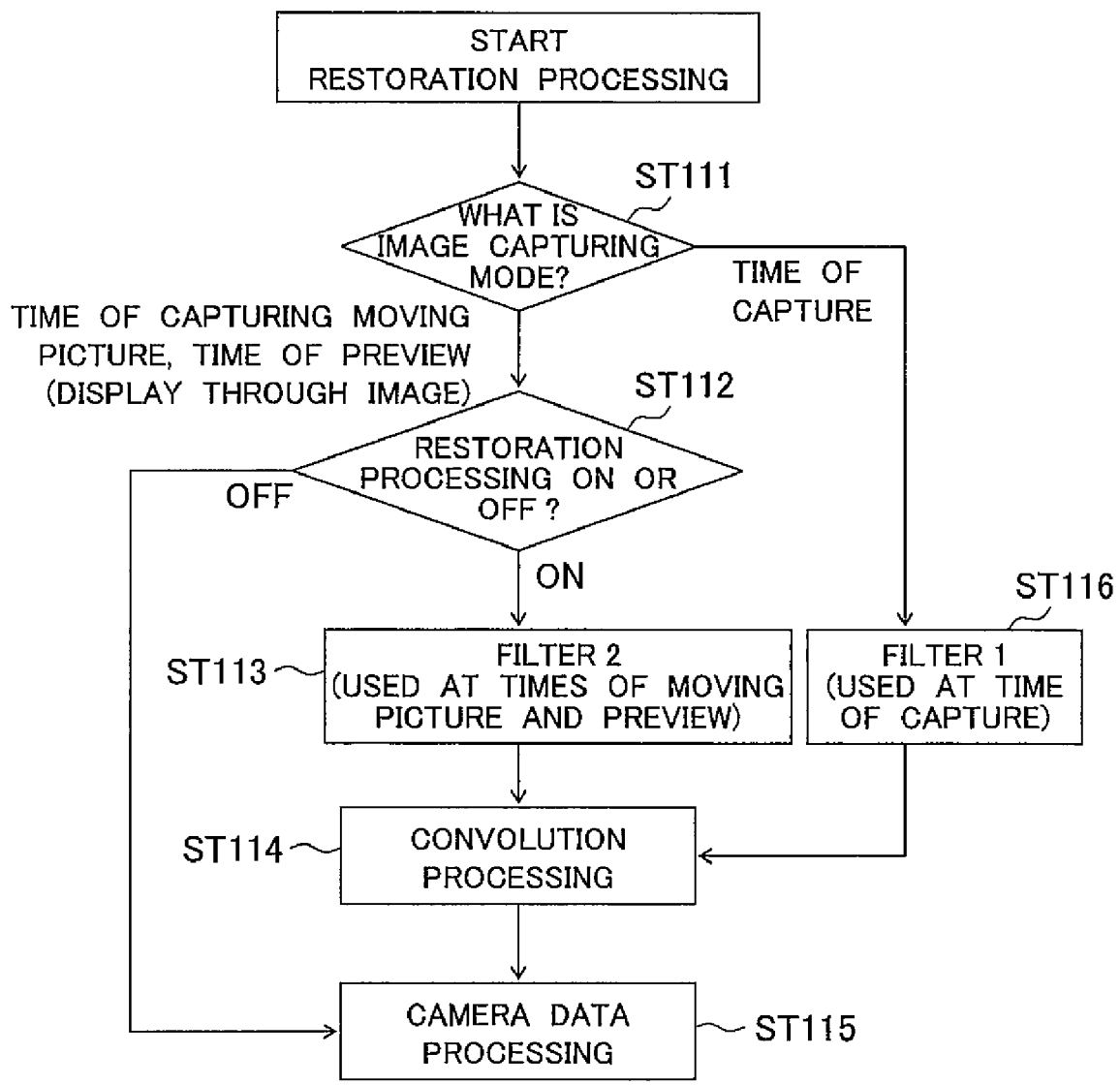
FIG. 34 is a diagram showing a basic control flow in the case for use for image restoration processing in accordance with the image capturing mode.

FIG. 34 is a diagram showing a basic control flow in the case of use for the image restoration processing in accordance with the image capturing mode.

At the time of capture, the image data is sent from the first switching unit 140-1 to the image processing device 150.

In this case, the image capturing mode is "capture" (ST111), so the first filter 210 is connected to the image processing device 150 by the second switching unit 140-2, and the convolution operation is carried out by using the first filter 210 (ST116, ST114).

When the user selects "no image restoration processing" by the operating unit 190 as the processing at the time of the preview (ST111, ST112), the image data from the imaging element passes through the first switching unit 140-1 and is directly transferred to the camera signal processing unit 160 where it is subjected to the predetermined processing (ST115).

When restoration processing is selected (ST112), the image data is sent from the first switching unit 140-1 to the image processing device 150. Then, since the image capturing mode is the time of preview, the second filter 220 for the time of capturing a moving picture is selected. The convolution processing is carried out by using filters having different sizes at the time of capture, the time of preview, and the time of capturing a moving picture (ST113, ST114).

The rest of the configuration is the same as that of the first embodiment explained above.

As explained above, according to the second embodiment, provision is made of the optical system 110 designed so that the image is not focused even at the focus position, but the PSF (Point Spread Function) becomes almost constant at approximately the focus position, the imaging element 120 capturing the image of the optical system, the image processing device 150 performing the blurring restoration processing, the camera signal processing unit 160 obtaining the final image, the image monitoring device 180 displaying the image output from the camera signal processing unit 160, displaying the through image in order to determine the image angle and capture timing, and displaying the captured image, the first filter 210 used for the image restoration processing of the converting means at the time of the still image capturing mode, the second filter 220 used for the image restoration processing of the converting means at the time of the capturing a moving picture and/or time of displaying a through image, and the second switching unit 140-2, the first filter or second filter is selected in accordance with the image capturing mode, and the image restoration processing in accordance with the image capturing mode is carried out at the image processing device 150, therefore the following effects can be obtained in addition to the effects of the first embodiment explained above.

According to the second embodiment, image restoration processing at the time of capture, time of preview, and time of capturing a moving picture can be carried out in real time as well, and the focused restoration image can be obtained without deterioration of the restored image.

Further, when image restoration processing is not needed particularly at the time of preview, for example, if no image restoration processing is selected at the time of the preview, a reduction in the power consumption of the optical system can be achieved.

Namely, according to the above configuration, by performing simple restoration processing during the display of the through image for determining the image angle and shutter timing, the frame rate can be set to a high speed while outputting a good image of only a size large enough for display on the monitor. When capturing the image, the restoration processing is carried out first time, therefore a certain degree of time may be taken for the processing time, so it becomes possible to configure a low price restoration processing system.

Note that, the above embodiments were explained by taking as an example a case a single optical systems, but the present invention can be applied with respect to an imaging device having a plurality of optical systems as well.

Figure 35:
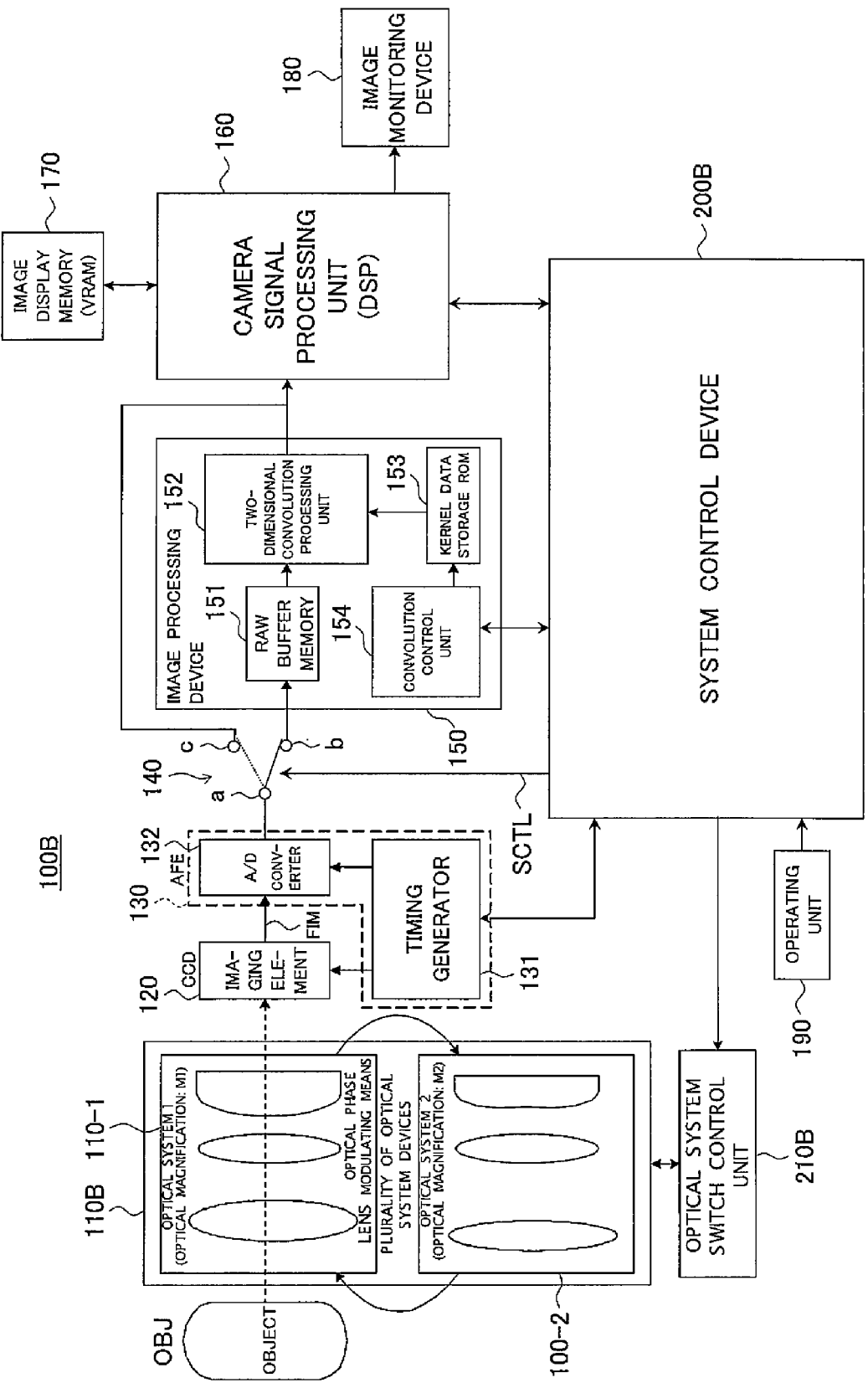
FIG. 35 is a block diagram showing the configuration of an imaging device having a plurality of optical systems according to a third embodiment of the present invention.

FIG. 35 is a block diagram showing the configuration of an imaging device having a plurality of optical systems according to a third embodiment of the present invention.

The difference of an imaging device 100B according to the third embodiment and the imaging device 100 according to the first embodiment (FIG. 3) resides in that an optical unit 110B has a plurality of (two in the present embodiment) optical systems 110-1 and 110-2, a system control device 200B is provided in place of the exposure control device 200, and further an optical system switch control unit 210B is provided.

The optical unit 110B has a plurality of (two in the present embodiment) optical systems 110-1 and 110-2 and supplies images capturing the object OBJ to the imaging element 120 in sequence in accordance with the switching of the optical system switch control unit 210B.

The optical systems 110-1 and 110-2 have different optical magnifications and optically fetch pictures of the imaged object OBJ.

The system control device 200B basically has the same function as that of the exposure control device, waits for the operation inputs of the operating unit 190 etc., determines the operation of the overall system in accordance with these inputs, controls the optical system switch control unit 210B, AFE 130, switching unit 140, image processing device 150, DSP 160, etc., and conducts the mediation control of the overall system.

The rest of the configuration is the same as that of FIG. 3.

Figure 36:
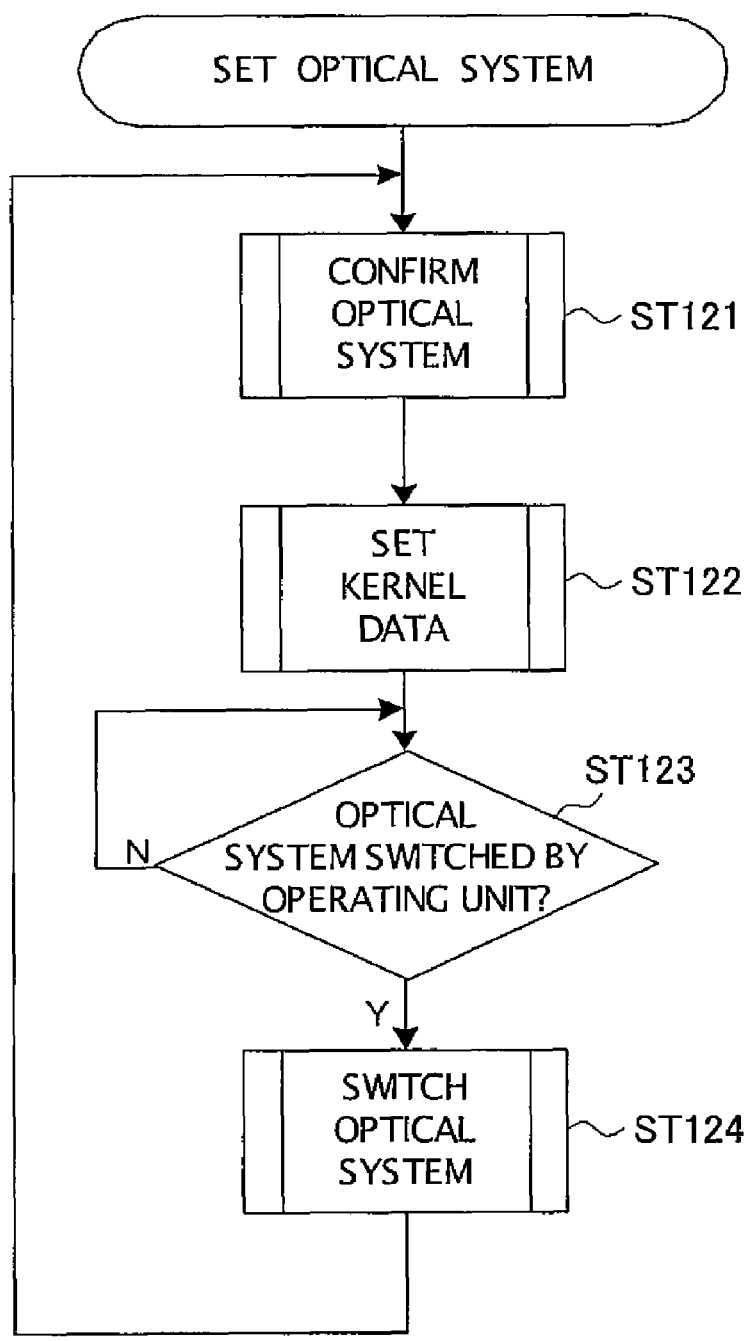
FIG. 36 is a flow chart schematically showing processing for setting an optical system of a system control device of FIG. 35.

FIG. 36 is a flow chart schematically showing processing for setting the optical systems of the system control device 200B.

First, the optical system is confirmed (ST121), and the kernel data is set (ST122).

If switching of the optical system is instructed by operation of the operating unit 190 (ST123), the output of the optical system of the optical unit 110B is switched by the optical system switch control unit 210B, and the processing of step ST121 is carried out (ST124).

According to the embodiment of FIG. 35, the following effects can be obtained in addition to the effects of the imaging device of FIG. 3 explained before.

Namely, the imaging device of FIG. 35 includes the optical unit 110B including a plurality of optical systems 110-1 and 110-2 having different magnifications and the imaging element 120 for forming the first order image and the image processing device 150 for forming the first order image to the high definition final image. In the image processing device 150, by making the kernel size used at the time of the convolution operation and the coefficient used in the numerical processing thereof variable in accordance with the magnification of the optical system, learning this by input of the operating unit 190 etc., and linking this with the suitable kernel size in accordance with the magnification of the optical system or the above coefficient, there are the advantages that a lens can be designed without worrying about the magnification and defocus range, and image restoration with a high precise convolution becomes possible.

Further, there is the advantage that a so-called natural image where the image to be captured is in focus, but the background is blurred can be obtained without requiring optical lenses having a high difficulty, expensive cost, and large size and without driving the lenses.

Furthermore, the imaging device 100B according to the third embodiment can be used for the DEOS of a zoom lens designed considering small size, light weight, and cost in a digital camera, camcorder, or other consumer electronic device.

Figure 37:
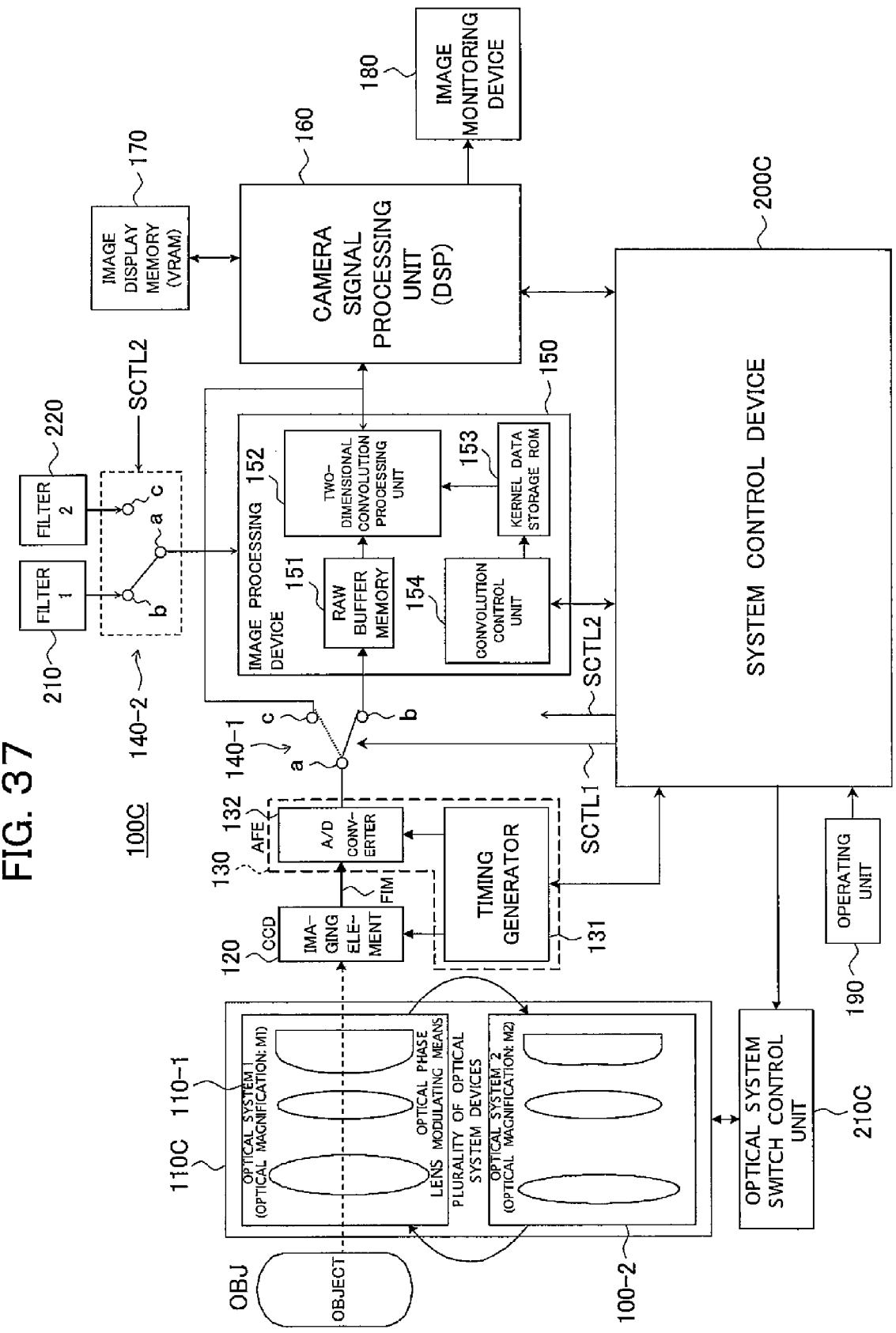
FIG. 37 is a block diagram showing the configuration of an imaging device having a plurality of optical systems according to a fourth embodiment of the present invention.

FIG. 37 is a block diagram showing the configuration of an imaging device having a plurality of optical systems according to a fourth embodiment of the present invention.

The difference of an imaging device 100C according to the fourth embodiment and the imaging device 100 according to the second embodiment (FIG. 33) resides in that an optical unit 110C has a plurality of (two in the present embodiment) optical systems 110-1 and 110-2, a system control device 200C is provided in place of the exposure control device 200, and further an optical system switch control unit 210C is provided.

The optical unit 110C has a plurality of (two in the present embodiment) optical systems 110-1 and 110-2 and supplies images capturing the object OBJ to the imaging element 120 in sequence in accordance with the switching of the optical system switch control unit 210C.

The optical systems 110-1 and 110-2 have different optical magnifications and optically fetch pictures of the imaged object OBJ.

The system control device 200C basically has the same function as that of the exposure control device, waits for the operation inputs of the operating unit 190 etc., determines the operation of the overall system in accordance with these inputs, controls the optical system switch control unit 210C, AFE 130, switching unit 140, image processing device 150, DSP 160, etc., and conducts the mediation control of the overall system.

The rest of the configuration is the same as that of FIG. 33.

Note that the processing for setting the optical system of the system control device 200C is generally performed in the same way as the flow chart shown in FIG. 36, so an explanation thereof is omitted here.

According to the embodiment of FIG. 37, the following effects can be obtained in addition to the effects of the imaging device of FIG. 33 explained before.

Namely, the imaging device of FIG. 37 includes the optical unit 110C including a plurality of optical systems 110-1 and 110-2 having different magnifications and the imaging element 120 for forming the first order image and the image processing device 150 for forming the first order image to the high definition final image. In the image processing device 150, by making the kernel size used at the time of the convolution operation and the coefficient used in the numerical processing thereof variable in accordance with the magnification of the optical system, learning this by input of the operating unit 190 etc., and linking this with the suitable kernel size in accordance with the magnification of the optical system or the above coefficient, there are the advantages that a lens can be designed without worrying about the magnification and defocus range, and image restoration with a high precise convolution becomes possible.

Further, there is the advantage that a so-called natural image where the image to be captured is in focus, but the background is blurred can be obtained without requiring optical lenses having a high difficulty, expensive cost, and large size and without driving the lenses.

Furthermore, the imaging device 100C according to the present fourth embodiment can be used for the DEOS of a zoom lens designed considering small size, light weight, and cost in a digital camera, camcorder, or other consumer electronic device.

INDUSTRIAL APPLICABILITY

According to the present invention, the optical system can be simplified while maintaining a high frame rate, but without requiring expensive blurring restoration processing hardware, so the costs can be reduced and, in addition it is possible to obtain a restored image with little influence of noise, therefore the present invention can be applied to a digital still camera, a camera mounted in a mobile phone, a camera mounted in a digital personal assistant, an image checking device, an automatic control use industrial camera, and so on.

The invention claimed is:

1. An imaging device, comprising:
    an optical system formed so that an amount of blurring of a focal point becomes substantially constant at a focus position and at distances before and after the focal point,
    an imaging element capturing an object image passing through the optical system and generating an image signal,
    a converting means for correcting the blurring of the focal point of the image signal and generating a restored image signal,
    a signal processing means for performing predetermined image processing on one of the image signal and the restored image signal and generating a processed image,
    a switching means for selectively inputting the image signal or the restored image signal to the signal processing means,
    a storage means for storing the processed image of the signal processing means,
    a trigger signal generating means for generating a trigger signal instructing the image storage,
    an image monitoring means for displaying the processed image of the signal processing means, and
    a controlling means for inputting the image signal to the signal processing means through the switching means during display of a through image by the image monitoring means and, when receiving the trigger signal from the trigger signal generating means, inputting the restored image signal to the signal processing means.

2. An imaging device as set forth in claim 1, wherein the amount of blurring of the focal point is set using a resolution of the image monitoring means as an upper limit.

3. An imaging device as set forth in claim 1, wherein a minimal repeating unit of the pixel array is set to not more than 2 times a pixel pitch of the image monitoring means.

4. An imaging device as set forth in claim 1, wherein the controlling means restores the image captured by receiving the trigger signal by the converting means, then makes the image monitoring means display the restored image after processing the restored image by the signal processing means.

5. An imaging device as set forth in claim 1, wherein the control means makes the imaging element output an image having a required sufficient resolution by the resolution of the image monitoring means during the display of the through image.

6. An imaging method comprising the steps of;

capturing, by an imaging element, an object image passing through an optical system formed so that an amount of blurring of a focal point becomes substantially constant at a focus position and at distances before and after the focal point, and generating an image signal from the object image, correcting, by an image processing device, the blurring of the focal point of the image signal to generate a restored image signal, performing predetermined image processing, by the signal processing unit, on one of the image signal and the restored image signal to generate a processed image, displaying, by a monitoring device, the processed image, storing, by a memory, the processed image in response to a trigger signal generated by an operating unit, selectively inputting, by a switch, the image signal or the restored image signal to a signal processing unit, wherein the switch selects the image signal to be input to the signal processing unit during a display of a through image by the monitoring device, and the switch selects the restored image signal to be input to the signal processing device when receiving the trigger signal from the operating unit.

* * * * *